(12) United States Patent
Ueda et al.

(10) Patent No.: US 7,302,456 B2
(45) Date of Patent: *Nov. 27, 2007

(54) STOCHASTIC PROCESSOR AND STOCHASTIC COMPUTER USING THE SAME

(75) Inventors: Michihito Ueda, Kyoto (JP); Katsuya Nozawa, Osaka (JP); Toyonori Munakata, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 853 days.

This patent is subject to a terminal disclaimer.

(21) Appl. No.: 10/701,082

(22) Filed: Nov. 5, 2003

(65) Prior Publication Data

US 2004/0186875 A1 Sep. 23, 2004

(30) Foreign Application Priority Data

Nov. 6, 2002 (JP) .............................. 2002-322246

(51) Int. Cl.
*G06J 1/00* (2006.01)
*G06G 7/00* (2006.01)

(52) U.S. Cl. .......................................... 708/3; 708/801

(58) Field of Classification Search .................... 708/3, 708/250, 255, 801
See application file for complete search history.

(56) References Cited

U.S. PATENT DOCUMENTS

| | | | | |
|---|---|---|---|---|
| 4,176,399 A | * | 11/1979 | Hoffmann et al. | 708/250 |
| 6,857,003 B2 | * | 2/2005 | Saito | 708/801 |
| 7,007,060 B2 | * | 2/2006 | Miller, Jr. | 708/801 |
| 7,188,131 B2 | * | 3/2007 | Bardouillet | 708/251 |
| 2005/0125471 A1 | * | 6/2005 | Sturm et al. | 708/250 |

OTHER PUBLICATIONS

Morie et al., "A CMOS Stochastic Associative Processor Using PWM Chaotic Signals", IEICE Transactions on Electronics, vol. E84-C, No. 12, Dec. 2001, pp. 1723-1729.

* cited by examiner

*Primary Examiner*—Tan V. Mai
(74) *Attorney, Agent, or Firm*—McDermott Will & Emery LLP

(57) ABSTRACT

A stochastic processor and a stochastic computer comprises a fluctuation generator configured to generate and output analog quantity having fluctuation comprised of chaos of tent mapping, a mixer configured to output a fluctuation superposed signal with the analog quantity output from the fluctuation generator superposed on an input signal represented by analog quantity and a thresholding unit configured to perform thresholding on the fluctuation superposed signal output from the mixer to generate and output a pulse.

19 Claims, 19 Drawing Sheets

STOCHASTIC PROCESSOR AND STOCHASTIC COMPUTER USING THE SAME

BACKGROUND OF THE INVENTION

1. Field of the Invention

The present invention relates to a stochastic processor and a stochastic computer using the stochastic processor. More particularly, the present invention provides a stochastic computer capable of operating vector matching as an operation essential to an MPEG encoding process or an image recognition process at high speeds by using a stochastic processor configured to carry out stochastic operation.

2. Description of the Related Art

With recent spread of personal computers (PCs), semiconductor devices have been increasingly used at home. In addition to numeric value calculation, personal uses such as Internet, mail, and image processing have been increasing.

However, in the PCs capable of high-speed operations, sufficient speeds are not achieved in all the operations. For example, in order to recognize a voice or speech given off by a person or recognize who a person being viewed through a camera is, enormous amount of operations are required to perform, and therefore, real time processing is difficult.

Basic process of such recognition process is to store data of a voice or face in vector form as reference vector, vectorize input data in the same manner and detect approximation between these data, and perform operation as to which of the reference vectors is closest to the input vector. Such vector comparison process is a basic process used in wide variety of data processing such as associative memory, vector quantization, and pattern recognition such as motion prediction, and data compression.

Such vector comparison requires enormous amount of operations in any of the applications. In Neuman-type computers which are typical of the conventional PCs, in principle, the closest vector cannot be extracted unless comparison operations of all the vectors are finished. As a result, very long time is required.

A novel conventional computer configured to operate "approximation" between plural numeric values (between a set of numeric values and a set of numeric values) is disclosed in "A CMOS Stochastic Associative Processor Using PWM Chaotic Signals" described in IEICE Transactions on Electronics, Vol. E84-C, No. 12, December 2001, pp 1723-1729.

FIG. 23 shows a configuration of the conventional stochastic computer.

The stochastic computer in FIG. 23 is configured to stochastically operate match/mismatch between digital data. When input data 103 matches stored data 103 (both are 1 or 0), 1 is output from a XNOR circuit 120. A PWM chaos generation circuit 121 is connected to an output side of the XNOR circuit 120, and configured to generate pulses whose width varies chaotically. When a latch signal 105 is input to a latch circuit 122 after a lapse of time after the PWM chaos has been generated, the input at this time is held in the latch circuit 122. Since the signal whose width varies chaotically varies is input to the latch circuit 122, an operation in which the value held in the latch circuit 122 becomes High is a stochastic operation. And, when High is held, the switch 109 is turned ON, and thereby allowing current to be supplied by a current source 107. The total sum of these currents is detected and is subjected to a comparison process by an high-order extraction circuit 111. The smaller a distance between the input data 101 and a group of stored data 103 is, the larger the current stochastically detected is, so that approximation between vectors (in this case humming distance) can be stochastically calculated. It should be appreciated that chaos used in the above described prior art uses so-called logistic chaos shown in a mapping map in FIG. 24.

However, in the conventional stochastic computer, some problems exist. First, the conventional stochastic processor is configured to only compare digital data, and therefore, cannot carry out an operation superior to that carried out by a current digital signal processor.

Second, while logistic chaos is used as the chaos, it has not been verified that stochastic operation becomes possible by using the logistic chaos, and therefore, operation reliability of the processor is doubtful.

Third, a width of the chaos or a threshold (latch time) is determined by trial and error. Therefore, how to design and drive the processor is obscure.

SUMMARY OF THE INVENTION

An object of the present invention is to provide a stochastic processor and a stochastic computer capable of deriving probability of chaos generation mathematically, capable of setting parameters which allow the probability to vary linearly, and capable of comparing analog data.

In order to achieve he above described object, a stochastic processor comprises a fluctuation generator configured to generate and output analog quantity having fluctuation comprised of chaos of tent mapping; a mixer configured to output a fluctuation superposed signal with the analog quantity output from the fluctuation generator superposed on an input signal represented by analog quantity; and a thresholding unit configured to perform thresholding on the fluctuation superposed signal output from the mixer to generate and output a pulse. With this configuration, linear stochastic operation can be carried out.

The thresholding unit may be configured to perform the thresholding on the fluctuation superposed signal to generate a two-valued pulse.

The stochastic processor may further comprise a pulse detection means configured to detect the pulse output from the thresholding unit.

The pulse detection means may include a counter configured to count the pulse.

The pulse detection means may include an integrator configured to integrate a width of the pulse. With this configuration, the width as well as the number of the pulses can be detected.

The stochastic processor may further comprise a variation detector configured to generate and output a pulse in at least one of rising and falling of the two-valued pulse output from the thresholding unit.

The stochastic processor may further comprise a pulse detection means configured to detect the pulse output from the variation detector.

When a maximum value of the analog quantity having the fluctuation is $w_{max}$, and a maximum value and a minimum value of the input signal are $V_{max}$ and $V_{min}$, respectively, it is preferable that a threshold T of the thresholding unit is not less than $V_{max}$, and $w_{max}$ is equal to 1.5 times as large as or larger than difference between T and $V_{min}$. In this configuration, stochastic operation in which the number of generated pulses decreases as the input signal becomes larger, can be carried out reliably.

It is more preferable that T is equal to $V_{max}$, and $w_{max}$ is equal to 1.5 times as large as difference between $V_{max}$ and $V_{min}$. In this configuration, pulse generation efficiency in the case where the number of generated pulses decreases as the input signal becomes larger is maximized.

When a maximum value of the analog quantity having the fluctuation is $w_{max}$, and a maximum value and a minimum value of the input signal are $V_{max}$ and $V_{min}$, respectively, it is preferable that the threshold T of the thresholding unit is not less than $(2\ w_{max}/3+V_{max})$ and not more than $(w_{max}+V_{min})$. In this configuration, it is possible to realize linear pulse generation in which the number of generated pulses increases as the input signal becomes larger.

It is preferable that T is equal to $(3w_{max}+4V_{min})$, and $w_{max}$ is equal to $3\ (V_{max}-V_{min})$. In this configuration, pulse generation efficiency in the case where the number of generated pulses increases as the input signal becomes larger is maximized.

A stochastic computer of the present invention comprises a fluctuation generator configured to generate and output analog quantity having fluctuation comprised of chaos of tent mapping; a plurality of stochastic processing circuits including mixers and thresholding units, each of the mixers being configured to output a fluctuation superposed signal with the analog quantity output from the fluctuation generator superposed on an input signal represented by analog quantity, and each of the thresholding units being configured to perform thresholding on the fluctuation superposed signal output from the mixer to generate and output a pulse; and a pulse detection means configured to detect pulses output from the thresholding units in the plurality of stochastic processing circuits. In this configuration, a plurality of input signals can be processed in parallel.

One output ends of the thresholding units in the plurality of stochastic processing circuits may be connected in parallel to a common wire having an end connected to the pulse detection means, and delay circuits may be each provided on a portion of the common wire between positions where the output ends of the thresholding units are connected to the common wire. In this configuration, one pulse detection means can detect the pulses corresponding to the total sum of the plurality of input signals.

The stochastic computer may further comprise distance calculators in a predetermined number configured to calculate differences in elements in the predetermined number between the input vector and the reference vector, the stochastic processing circuits are provided in the predetermined number, and outputs of the distance calculators in the predetermined number are input to the mixers of the stochastic processing circuits in the predetermined number as the input signal, respectively. In this configuration, Manhattan distance between vectors can be calculated.

The stochastic computer may further comprise a plurality of stochastic distance calculation circuits having the distance calculators in the predetermined number and the stochastic processing circuits in the predetermined number, the pulse detection means may be provided so as to correspond to the plurality of stochastic distance calculation circuits, and the plurality of reference vectors may be input to the plurality of stochastic distance calculation circuits, respectively. In this configuration, vector matching can be carried out.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the drawings.

Embodiment 1

In a first embodiment, a signal is represented by a voltage. Alternatively, the signal may be represented by another analog quantity (physical quantity, e.g., current). Also, data represented by the signal is preferably analog data but may be multi-valued data such as three or more valued data.

Figure 1:
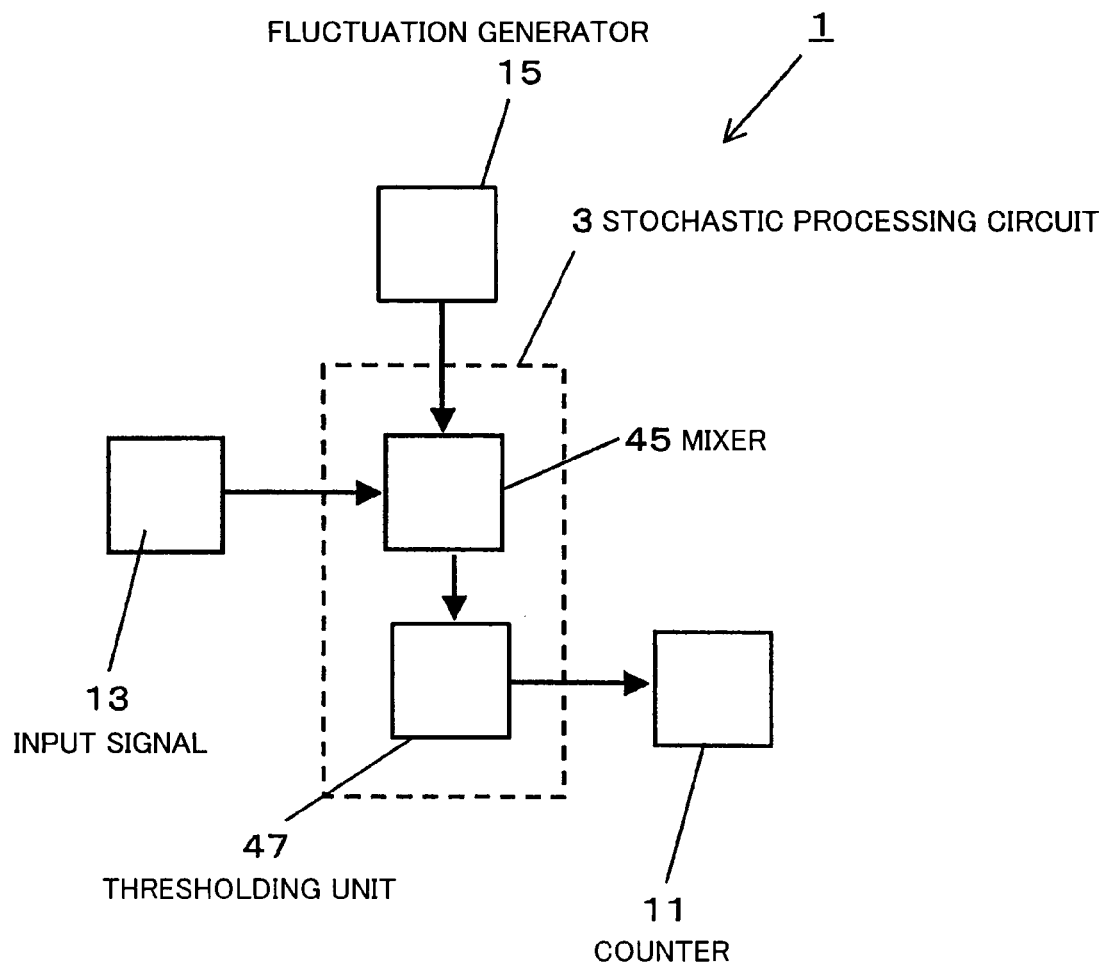
FIG. 1 is a block diagram showing a configuration of a stochastic processor according to a first embodiment of the present invention.

FIG. 1 is a block diagram showing a configuration of a stochastic processor according to a first embodiment of the present invention.

Referring now to FIG. 1, a stochastic processor 1 comprises a fluctuation generator 15, a stochastic processing circuit 3, and a counter 11. The stochastic processing circuit 3 includes a mixer 45 and a thresholding unit 47. The fluctuation generator 15 outputs a voltage having fluctuation (hereinafter referred to as a fluctuation voltage). An input signal 13 as a voltage signal representing analog data is input to the mixer 45. The mixer 45 superposes the fluctuation voltage output from the fluctuation generator 15 on the input signal, and outputs the resulting signal. The thresholding unit 47 performs thresholding on the signal output from the mixer 45 and binarizes the signal to generate and output the pulses. The counter 11 counts the pulses output from the mixer 45.

The stochastic processor of this embodiment operates properly with the configuration in FIG. 1. For the purpose of a more reliable operation, the stochastic processor is preferably configured as shown in FIG. 2.

Figure 2:
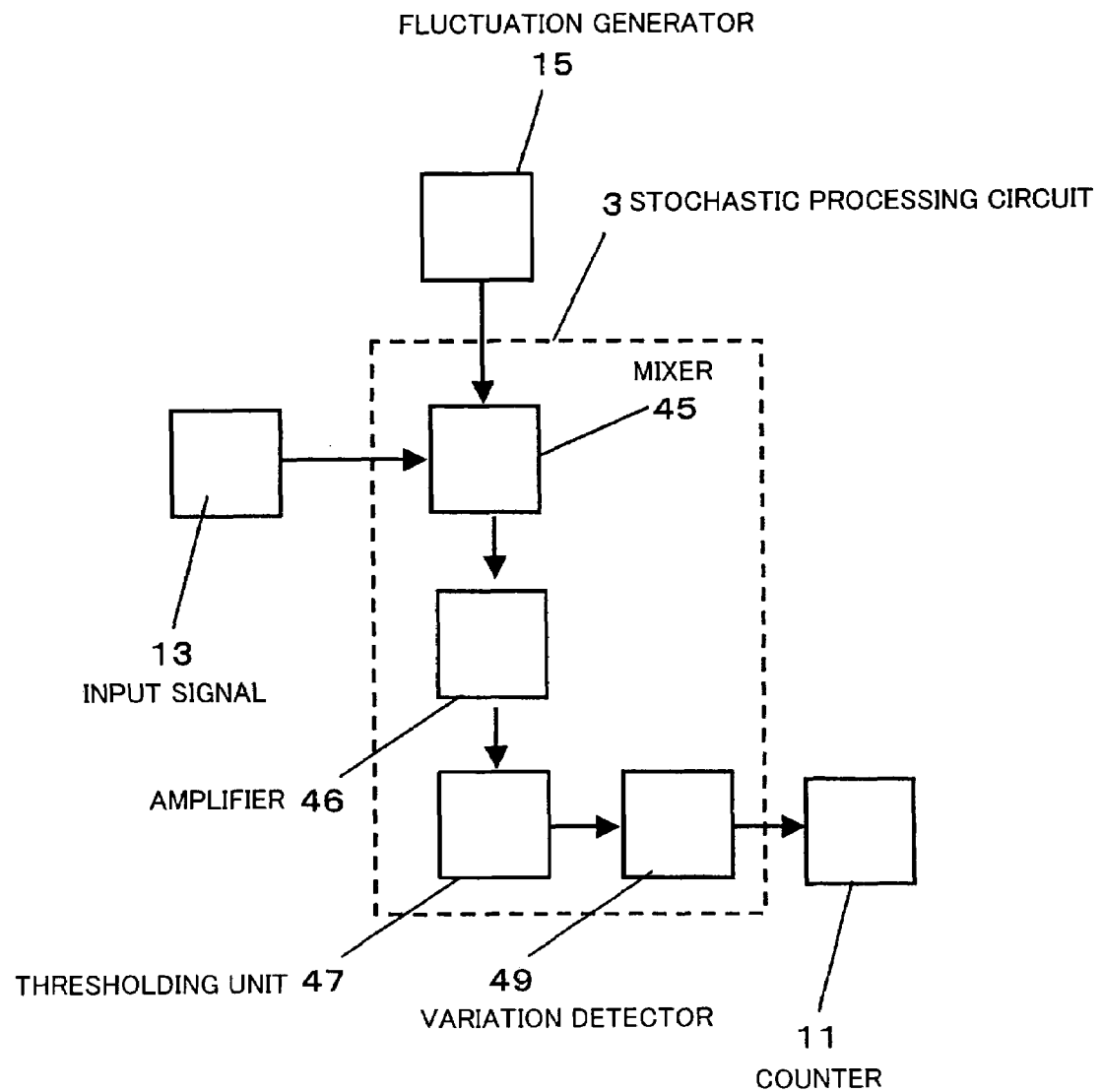
FIG. 2 is a block diagram showing another example of the configuration of the stochastic processor according to the first embodiment of the present invention.

FIG. 2 is a block diagram showing an example of another configuration of the stochastic processor of this embodiment.

In the configuration in shown in FIG. 2, an amplifier 46 is provided between the mixer 45 and the thresholding unit 47 and configured to amplify the signal from the mixer 45. A variation detector 49 is provided between the thresholding unit 47 and the counter 11 and configured to generate a pulse having a predetermined width in rising of the pulse output from the thresholding unit 47. The counter 11 counts the pulses output from the variation detector 49. In such a configuration, degradation of a signal level of the mixer 45 is compensated by the amplifier 46, and the variation detector 49 allows the pulses to be correctly counted as described below.

Subsequently, a configuration of each component of the stochastic processor 1 in FIGS. 1 and 2 will be described in detail.

Figure 3:
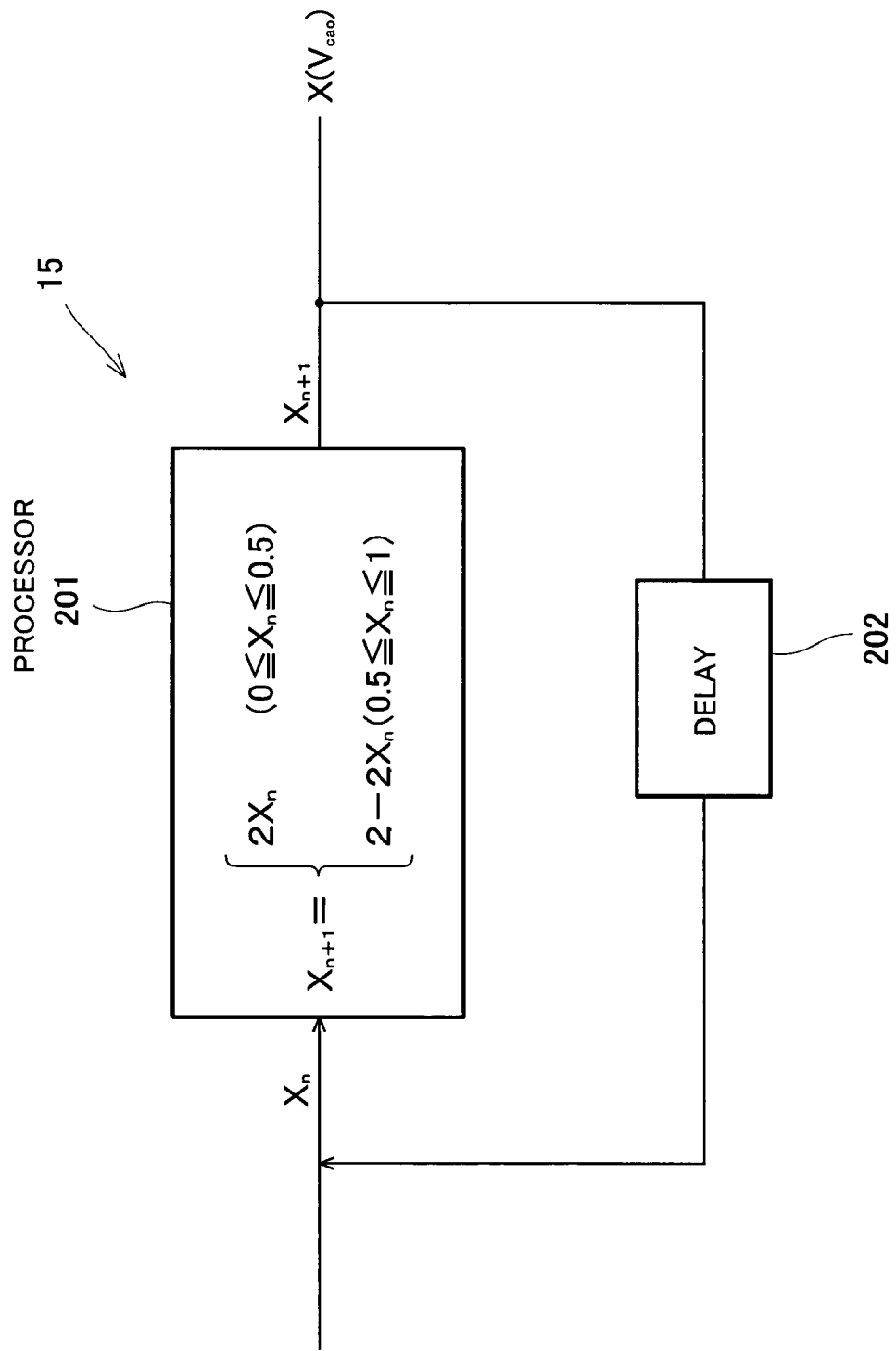
FIG. 3 is a block diagram showing an example of a configuration of a fluctuation generator of the stochastic processor in FIGS. 1 and 2.

FIG. 3 is a block diagram showing a configuration of the fluctuation generator 15. As shown in FIG. 3, the fluctuation generator 15 comprises a processor 201 configured to perform a predetermined operation on a variation amount X, and a delay circuit 202 configured to delay a signal output from the processor 201 and input the delayed signal to the processor 201. As described in detail later, a variation amount X comprising a chaos of a tent mapping is output from the processor 201. In this embodiment, the variation amount X is represented by a voltage and output as a fluctuation voltage $V_{cao}$.

Figure 4:
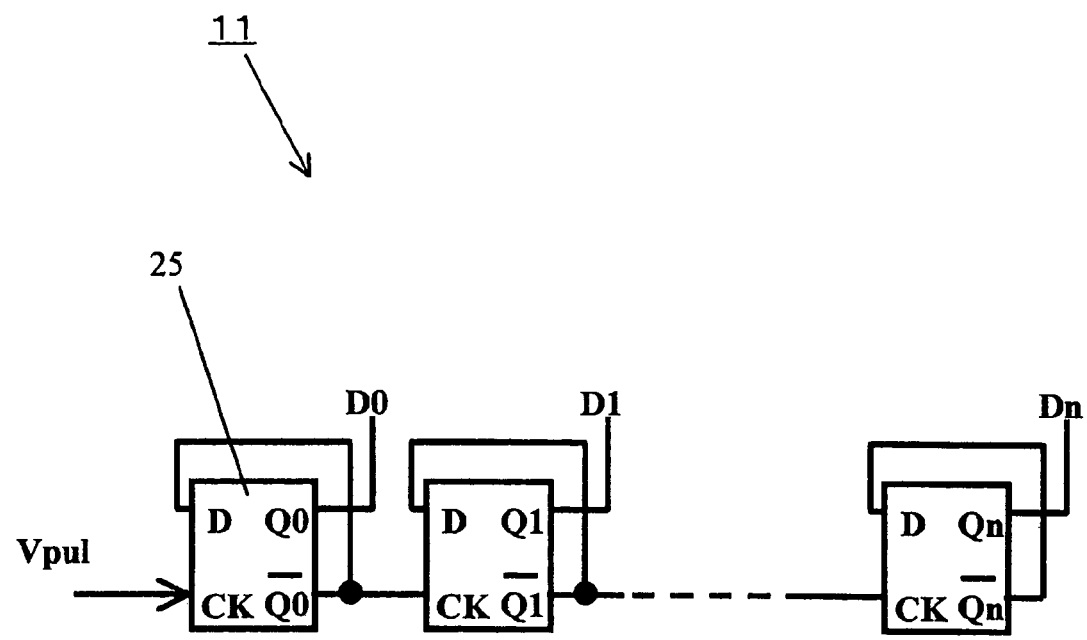
FIG. 4 is a circuit diagram showing an example of a configuration of a counter of the stochastic processor in FIGS. 1 and 2.

The counter 11 is, for example, comprised of an asynchronous ripple counter using D flip flop shown in FIG. 4.

In FIG. 4, 25 denotes the D flip flop. When a voltage pulse $V_{pu}$ is input to the counter 11, High output of $D_0, D_1, \ldots D_n$, switches in binary form Thereby, the number of input pulses is known.

The counter 11 of this embodiment is an up-counter that increases count when $V_{pu}$ varies from Low to High.

Figure 5:
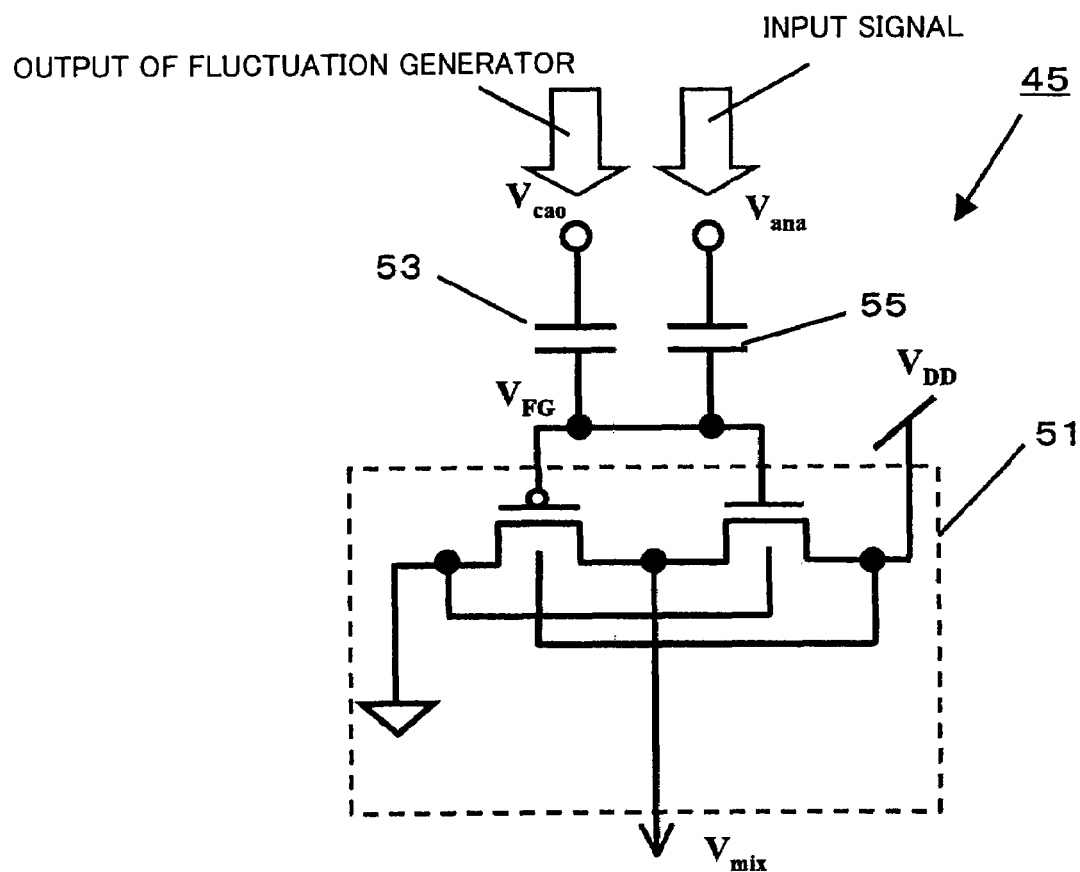
FIG. 5 is a circuit diagram showing an example of a configuration of a mixer of the stochastic processor in FIGS. 1 and 2.

FIG. 5 is a circuit diagram showing an example of a configuration of the mixer 45. The mixer 45 has a structure similar to a device structure called neuron MOS (v MOS), and basically has a structure in which capacitors are connected to a gate electrode of a MOS transistor.

In FIG. 5, the mixer 45 has a source follower circuit 51. The source follower circuit 51 has a characteristic in which a voltage proportional to a potential ($V_{FG}$) of the gate electrode is output ($V_{mix}$). A lower electrode of a first capacitor 53 is connected to a gate electrode of the source follower circuit 51. A lower electrode of a second capacitor 55 is connected to a gate electrode of the source follower circuit 51. In the first embodiment, the voltage $V_{cao}$ of the fluctuation generator 15 is input to an upper electrode of the first capacitor 53 and an input signal $V_{ana}$ is input to an upper electrode of the second capacitor 55.

Subsequently, a function of superposing an input voltage, which is performed by the mixer 45 in the configuration in FIG. 5, will be described.

When the potential of the gate electrode in the source follower circuit 51 is $V_{FG}$, capacitance of the first capacitor 53 is $C_1$, a voltage input to the first capacitor 53 is $V_1$, capacitance of the second capacitor 55 is $C_2$, a voltage input to the second capacitor 55 is $V_2$, and capacitances of a PMOS and a NMOS forming the source follower circuit 55 are $C_P$ and $C_N$, respectively, the following formula is established according to a charge retention rule:

$$Q = C_1(V_1 - V_{FG}) + C_2(V_2 - V_{FG}) = V_{FG}(C_P + C_N)$$

Here, $C_1 = C_2$, and $\alpha$ is defined according to the following formula:

$$\alpha = \frac{C_1}{2C_1 + C_N + C_P} = \frac{1}{2 + \left[\frac{C_N + C_P}{C_1}\right]}$$

From the formulae (1) and (2), the following formula is derived:

$$V_{FG} = \alpha(V_1 + V_2)$$

According to the characteristic of the source follower circuit 51, $V_{mix}$ corresponding to $V_{FG}$ is output. Since in the source follower circuit 51, a threshold of each MOS is controlled to cause the MOS to output a voltage equal to the input, the output proportional to the sum of $V_1$ and $V_2$ is obtained. In the formula (2), when $C_1$ is larger relative to $(C_N + C_P)$, that is, a gate capacitance of the MOS transistor is sufficiently small, $\alpha$ approximates 0.5 and the mixer 45 exhibits a characteristic in which an approximately average value of the input voltages is output.

In the first embodiment, in order to handle each potential easily, the output of the mixer 45 is multiplied by $1/\alpha$, i.e., approximately doubled by the amplifier 46. Thus, degradation of the signal level is compensated. To this end, the amplifier 46 is provided in the configuration in FIG. 2.

Figure 6:
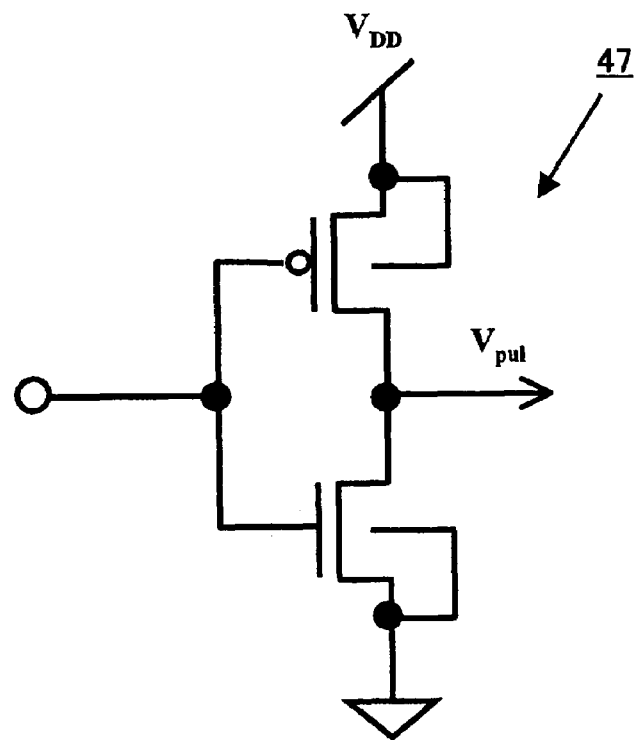
FIG. 6 is a circuit diagram showing a configuration of a thresholding unit of the stochastic processor in FIGS. 1 and 2.

FIG. 6 is a circuit diagram showing a configuration of the thresholding unit 47. In this embodiment, the thresholding unit 47 is comprised of, for example, a CMOS inverter.

Figure 7:
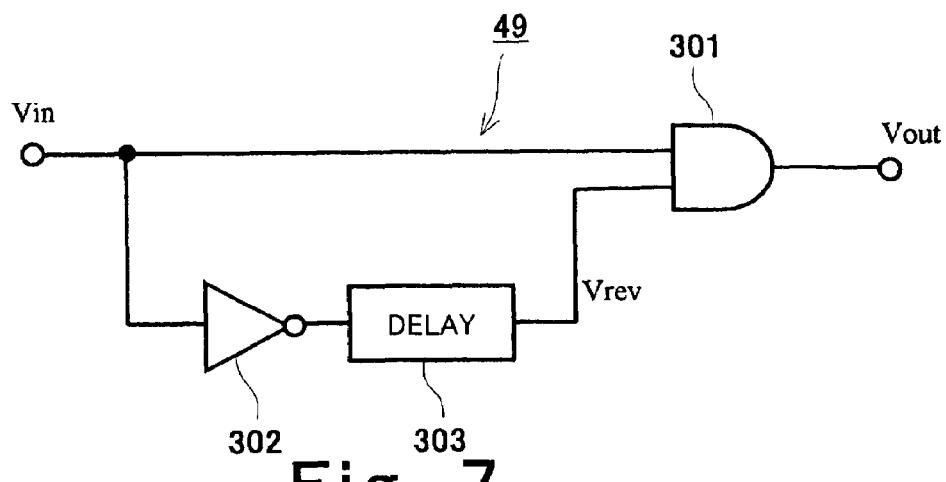
FIG. 7 is a circuit diagram showing an example of a circuit configuration of a variation detector of the stochastic processor in FIG. 2.

In FIG. 7, $V_{in}$ represents an input voltage input from the thresholding unit 47. In the variation detector 49, $V_{in}$ is directly input to an AND logic circuit 301. $V_{in}$ is also inverted by an inverter 302 and then delayed by a delay circuit 303, and the resulting $V_{rev}$ is input to the AND logic circuit 301. And, AND logic of these inputs is output from the AND logic circuit 301 as a voltage $V_{out}$.

Figure 8:
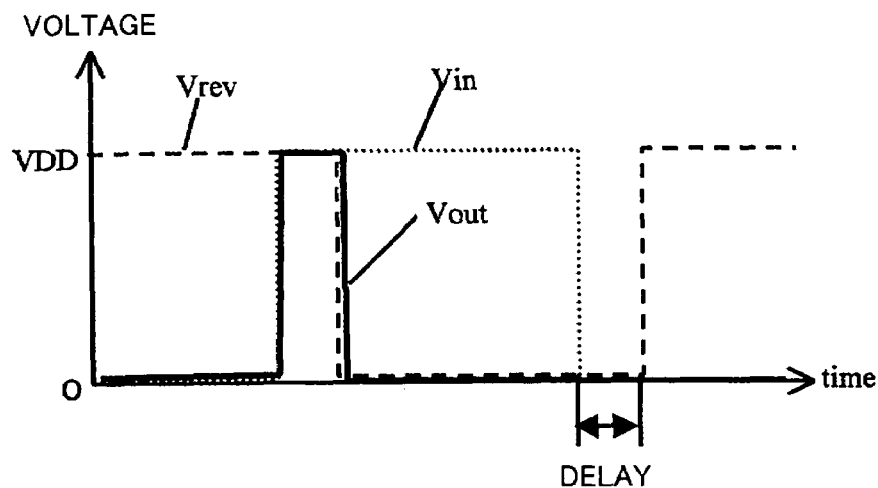
FIG. 8 is a view for explaining an operation of the variation detector.

FIG. 8 is a graph showing a detailed operation of the variation detector 49. In FIG. 8, an abscissa axis represents time and an ordinate axis represents a voltage. Also, a dotted line represents $V_{in}$, a broken line represents $V_{rev}$, and a solid line represents $V_{out}$. When $V_{in}$ varies in the form of pulse, $V_{rev}$ obtained by inverting and delaying $V_{in}$ is an inverted signal of $V_{in}$ that has a predetermined delay time, as shown in FIG. 8. As a result, the AND logic of these is calculated, and a voltage $V_{out}$ having a pulse only in rising of $V_i$ at which $V_{in}$ and $V_{rev}$ become High is output. In this case, a width corresponding to the delay time is a pulse width. The counter 11 counts the output $V_{out}$ of the variation detector 49 as the number of pulses. This is effective when one counter counts pulses output from a plurality of stochastic processors, as described later in an embodiment. This is because, when pulses having different pulse widths are output, the pulses overlap with one another and are therefore impossible to count correctly, but by defining the pulse width to allow spacing between the pulses to be controlled, the number of pulses can be reliably counted.

As a matter of course, the AND logic circuit 301 may be replaced by, for example, XNOR circuit. Thereby, pulses can be generated in both of rising and falling of pulses in which a value of $V_{in}$ is equal to a value of $V_{rev}$, and similar function is realized.

An operation of the stochastic processor configured as described above, will now be described.

Turning back to FIG. 1, when a fluctuation voltage is output from the fluctuation generator 15 while the input signal 13 is input to the mixer 15, a signal of a voltage (fluctuation superposed signal: hereinafter, referred to as a fluctuation superposed voltage) obtained by superposing a fluctuation voltage on the input signal 13 is output from the mixer 45. The fluctuation superposed voltage signal is subjected to thresholding process by the thresholding unit 47 and a two-valued signal taking a value of High or Low, i.e., a two-valued pulse signal, is output.

Figure 9:
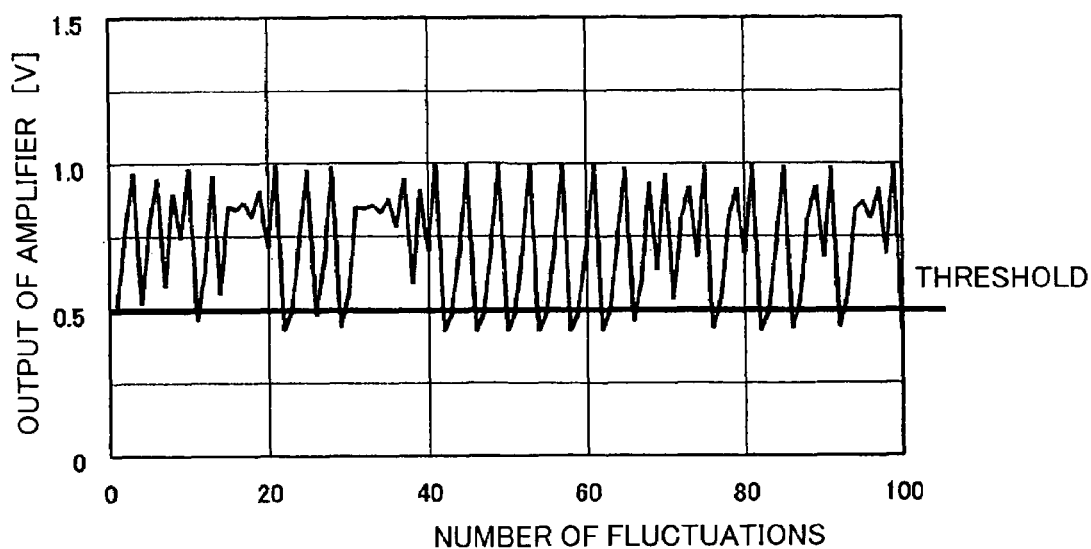
FIG. 9 is a graph showing a relationship between an output of a mixer (amplifier) and a threshold.
Figure 10:
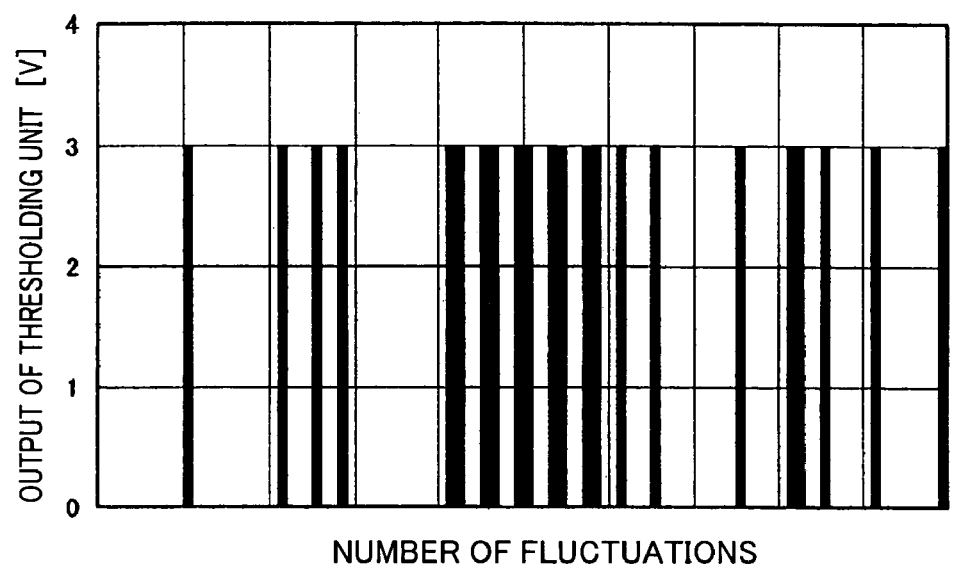
FIG. 10 is a graph showing an output of a thresholding unit.

FIG. 9 shows a waveform of an output of the amplifier 46 obtained by amplifying the output of the mixer 45 obtained by superposing the fluctuation voltage, as an example of an operation of the stochastic processor of this embodiment. FIG. 10 shows an output of the thresholding unit 47 in the case where the thresholding unit 47 performs thresholding process on the output of such a waveform using 0.5V as a threshold. Since the thresholding unit 47 is an inverter in this embodiment, the amplifier 46 outputs a pulse when the fluctuation superposed voltage is lower than the threshold. Although not shown, by inputting the output of the thresholding unit 47 to the above described variation detector 49, the amplifier 46 outputs a pulse having an equal width only in rising of the pulse, and the counter 11 counts the pulses stably.

As should be appreciated, in the stochastic processor of the first embodiment, probability of pulse generation varies according to a voltage level of the input signal 13, and therefore, High and Low of the voltage level can be obtained stochastically as the number of pulses.

In the stochastic processing circuit of the present invention, parameters that determine the operation are (1) type of fluctuation, (2) amplitude of fluctuation, and (3) value of threshold.

In the conventional example, correlation between these is determined by trial and error, and as a result, reliability of an operation of the processor is reduced.

As described later, the inventors found that, in the stochastic processor, a type of optimal chaos that carries out linear stochastic operation and an optimal value of each parameter are uniquely determined. According to this concept, a mathematic operation can be supported and the processor can be driven under the condition in which the pulse is generated most efficiently.

Hereinafter, a principle of obtaining the linear operation will be first described and an optimal driving method of the stochastic processing circuit, will then be described.

First of all, interpretation of the stochastic operation will be described. It may be considered that, by repeating the stochastic operation, for example, by repeating the operation numerous times (e.g., one hundred thousand times, one million times), the resulting solutions gradually come closer to a strict solution.

Histogram obtained by generating the conventional logic chaos (variation amount X) infinite times, i.e., probability of generation, (to be precise, stochastic density), is given by the following formula:

$$\rho(x) = \frac{1}{\pi\sqrt{x(1-x)}}$$

From this formula, it should be understood that the histogram is uneven, and probability of crossing a threshold from below to above is non-linear.

Figure 11:
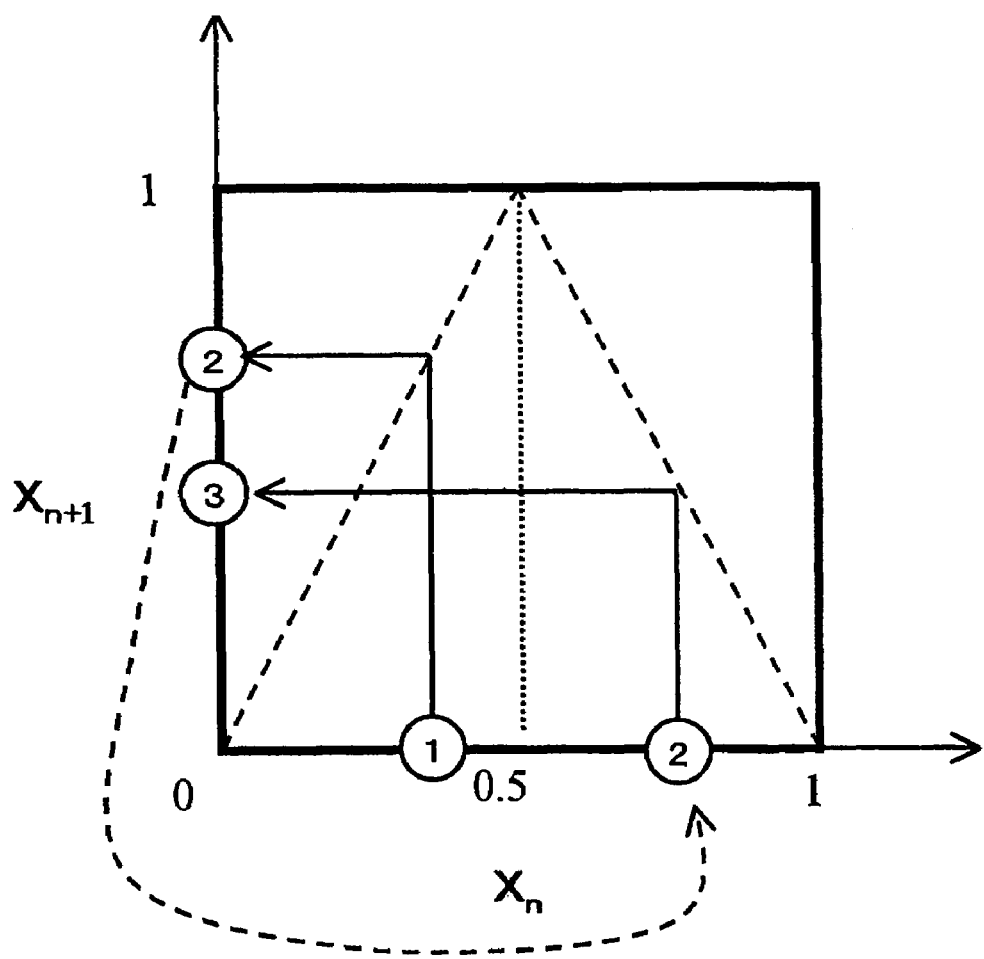
FIG. 11 is a view for explaining a chaos of a tent mapping for use in generation of a fluctuation voltage.

The inventors intensively studied such a characteristic, and found that generation probability of the chaos in the chaos of tent mapping shown in FIG. 11 becomes gradually closer to linear generation probability.

Hereinafter, this will be described.

The chaos in the tent mapping is chaos obtained from a mapping in FIG. 11, and is defined by the following formula:

$$X_{n+1} = \begin{cases} 2X_n & (0 \leq Xn \leq 0.5) \\ 2(1-X_n) & (0.5 \leq Xn \leq 1) \end{cases}$$

In FIG. 11, an abscissa axis $X_n$ represents a value of chaos generated at a time point (the number of times=n), and an ordinate axis $X_n+1$ represents a value of chaos generated at a subsequent time point (the number of times=N+1). As shown in FIG. 11, the mapping is named tent mapping because this is a triangular (tent-shaped) mapping in which $X_n+1=1$ when $X_n=0.5$.

In the tent mapping, the histogram is uniformly equal to 1 in all regions of the variation amount X, which is described in, for example, formulae (2.9) on page 31, Chaos in Dynamical System (E. Ott, Cambridge U. Press). It is verified that probabilities at which numeric values ranging between 0 and 1 are generated as the variation amount X are equal, when generation of the chaos (i.e., variation amount X) is observed for a long time period.

Hereinbelow, an event that pulse generation varies linearly as described above by using the chaos of the tent mapping, will be described.

Figure 12A:
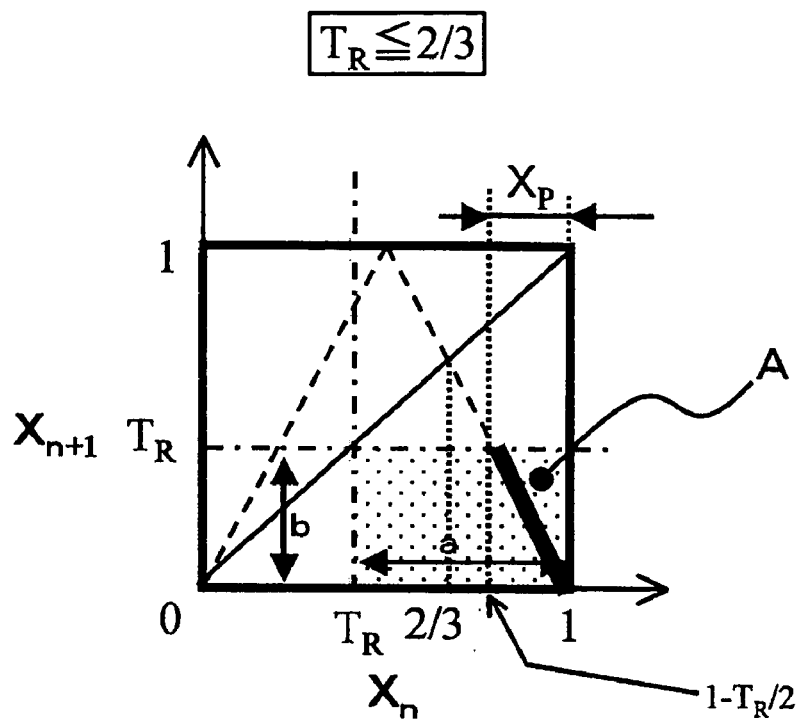
FIGS. 12A and 12B are views for explaining probability of pulse generation.
Figure 12B:
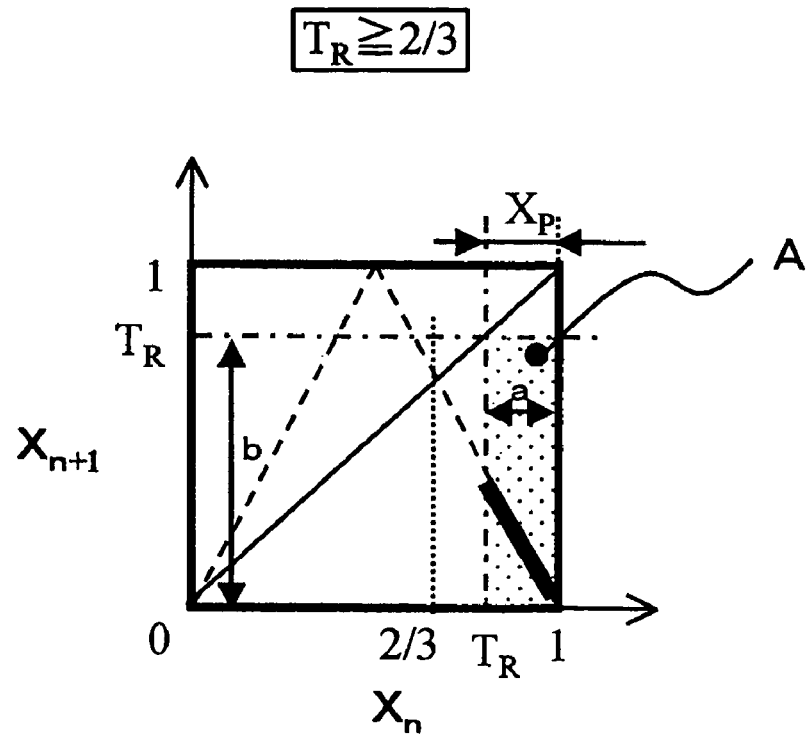

FIGS. 12A and 12B are views each showing probability of pulse generation. As described above, in this embodiment, setting is made so that a pulse is generated when a fluctuation voltage (i.e., variation amount X) crosses a threshold from above to below. Therefore, in FIGS. 12A and 12B, when $X_n$ lies within a region represented by a (region larger than a threshold $T_R$) and $X_n+1$ lies within a region represented by b (region smaller than the threshold $T_R$), the pulse is generated. The region that satisfies these is represented by "A" in FIGS. 12A and 12B. With regard to a line of mapping, it can be understood that the pulse is generated when the input is in the range of $X_p$ in $X_n$.

Since in the tent mapping, the probability of generation of all the values for the variation amount X is uniform, pulse generation probability P is given by the following formula:

$$P = X_p/1 = X_p \quad (6)$$

It is understood that, by increasing $T_R$, a range of $X_p$ varies at an intersection point where $X_n+1=2-2X_n$ and $X+1=X_n$ intersect, i.e., $X_n=2/3$, shown in FIGS. 12A and 12B. Specifically, FIG. 12A represents the range of $X_p$ in the case of $T_R \leq 2/3$, and FIG. 12B represents the range of $X_p$ in the case of $T_R \geq 2/3$. These are summarized as represented by the following formula:

$$P = \begin{cases} T_R/2 & (0 \leq T_R \leq 2/3) \\ 1 - T_R & (2/3 \leq T_R \leq 1) \end{cases}$$

Hereinbelow, this formula is called a formula (7).

Figure 13:
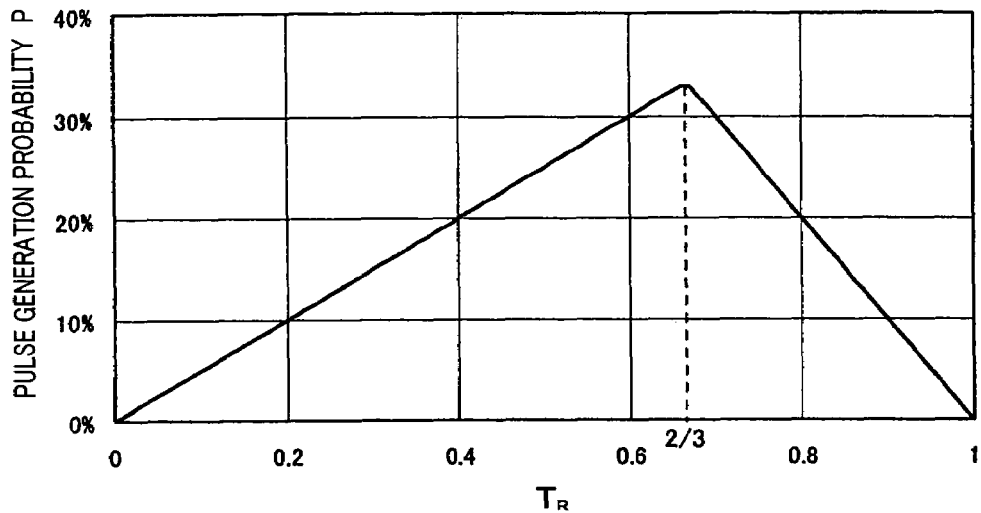
FIG. 13 is a graph showing a variation in pulse generation probability with respect to a threshold of the stochastic computer in FIGS. 1 and 2.

Regarding the formula (7), a result of calculation of the value of pulse generation probability P in the region of $0 \leq T_R \leq 1$ is shown in FIG. 13.

As shown in FIG. 13, the pulse generation probability P is equal to 1/3 corresponding to a maximum value in the case of $T_R=2/3$, and the pulse generation probability P is equal to zero, i.e., minimum value in the case of $T_R=0$ or 1.

Figure 14:
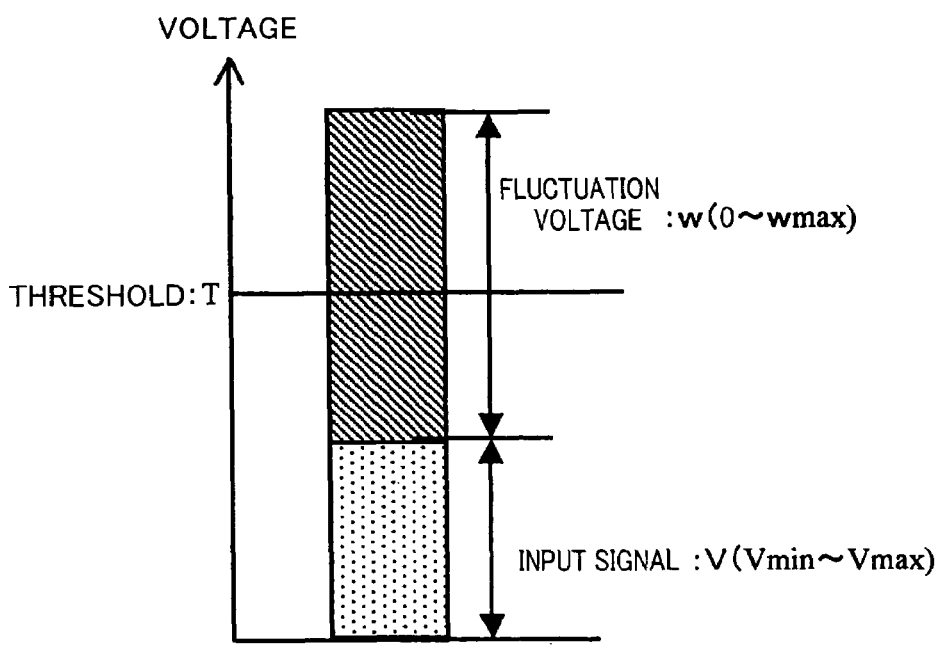
FIG. 14 is a view showing correlation between parameters that define an operation of the stochastic processor in FIGS. 1 and 2.

Here, an actual value of the threshold is defined as T, a value of the above input signal $V_{ana}$ is defined as V ($V_{min} \leq V \leq V_{max}$), and a value of the fluctuation voltage $V_{cao}$ is defined as w ($0 \leq w \leq w_{max}$). FIG. 14 shows a correlation between values for these parameters. Since the value of the fluctuation voltage is generated in the range of $0 \leq w \leq w_{max}$, $T_R$ in FIG. 12 is given by the following formula:

$$T_R(T-V)/w_{max}$$

Hereinbelow, this formula is called a formula (8).

Here, the pulse generation probability P becomes maximum when the value V for the input signal is $V_{min}$, and becomes minimum when the value V for the input signal is $V_{max}$. In addition, in order for V to be linear in the range of $V_{min}$ to $V_{max}$, one of the following formulae must be established, based on FIG. 13:

$$\begin{cases} 0 \leq T_R(V_{max}) \leq T_R(V_{min}) \leq \frac{2}{3} \\ \frac{2}{3} \leq T_R(V_{min}) \leq T_R(V_{max}) \leq 1 \end{cases}$$

Hereinbelow, this formulae are called formulae (9).

Here, by using the formula (8), the following formulae are derived.

$$\begin{cases} 0 \leq \frac{T-V_{max}}{w_{max}} \leq \frac{T-V_{min}}{w_{max}} \leq \frac{2}{3} \\ \frac{2}{3} \leq \frac{T-V_{min}}{w_{max}} \leq \frac{T-V_{max}}{w_{max}} \leq 1 \end{cases}$$

Hereinbelow, this formulae are called formulae (10).

Here, considering that $V_{min} < V_{max}$, the second formula of the formulae (10) does not have a solution (this formula is a solution in the case where the number of pulses becomes maximum when $V=V_{max}$ and becomes minimum when $V=V_{min}$.) In the stochastic processor of this embodiment, the range of $T_R$ is determined as $0 \leq T_R \leq 2/3$. The pulse generation probability P is calculated as $P=T_R/2$ uniquely from the formula (7).

Here, pulse generation probability difference: η is defined as $\eta = P(V_{min}) - P(V_{max})$. From the result of these, $$\eta = P_{max} - P_{min} = \frac{V_{max} - V_{min}}{2w_{max}}$$

Hereinbelow, this formula is called a formula (11).

It should be understood that the pulse generation probability difference is determined by a ratio between an amplitude of the input signal $V_{ana}$ and the maximum value of the fluctuation signal $V_{cao}$.

From this formula, it should be understood that the processor of this embodiment has good detection capability in the case where the input signal $V_{ana}$ varies only slightly. Assuming that the fluctuation voltage is generated at a frequency of 100 MHz for one second, and the maximum value $w_{max}$ of the fluctuation voltage is, for example 1[V], $\eta=5\times10^{-4}$ and the difference in the number of pulses is $5\times10^{-4}\times10^{-9}=50$ thousands pulses and is detected as a very large difference, even when the input signal has a minute amplitude of $V_{max}-V_{min}=1$[mV].

From the first formula of the formulae (10), the following formula is established:

$$w_{max} \geq \frac{3}{2}(T - V_{min})$$

Hereinbelow, this formula is called a formula (12).

$$T \geq V_{max}$$

Hereinbelow, this formula is called a formula (13).

From the formula (13), the threshold T needs to be set to a value not less than the maximum value $V_{max}$ of the input signal $V_{ana}$. Simultaneously, from the formula (12), the maximum value of the fluctuation voltage $V_{cao}$ needs to be set to a value 1.5 times as large as or larger than (threshold minus minimum value $V_{min}$ of the input signal).

It has been revealed that, according to a characteristic of $V_{max}$ and $V_{min}$ of the input signal $V_{ana}$ as described above, the threshold T can be determined and the amplitude of the fluctuation voltage $V_{cao}$ to be added can be determined.

By determining parameters using a method found by the inventors, it is possible to provide a stochastic processor capable of mathematically verifying that the pulse generation probability P is linear.

This is very important to the processor configured to operate stochastically like the processor of this embodiment, and can significantly improve reliability of an operation of the processor.

As should be appreciated, in accordance with the stochastic processor of the inventor of the present invention, the histogram of chaos generation can be made uniform, probability of chaos generation can be mathematically derived, and a procedure for setting the parameters to cause the probability to vary linearly becomes very clear, by using the chaos of the tent mapping as the chaos. In the conventional stochastic processor, there have been no grounds (substantially non-linear) for the correlation between the number of pulses and matching result. On the other hand, by carrying out the operation using the chaos of the tent mapping, it is possible to provide a processor that has high reliability and high operation accuracy.

While the up-counter is used as the counter in this embodiment, the same stochastic formulae are gained by using a down-counter, i.e., by counting the number of times the fluctuation superposed voltage transitions from below to above, crossing the threshold.

An output portion of the stochastic processing circuit 3 is further provided with a switch configured to be turned ON/OFF so that the number of and the width of the pulses can be controlled. For example, this switch may be configured to be turned ON/FF in synchronization with a period of generation of the chaos (variation amount X) of the fluctuation generator 15. In the output of the thresholding unit 47 in FIG. 10, a wider pulse exhibits a pulse having two fluctuations (two-generated chaoses). With this configuration, all the pulses have an equal width, and the wider pulse is divided into two pulses. By counting the pulses output from the switch by the counter 11, the number of and the width of the pulse output from the thresholding unit 47 can be evaluated. The period of ON and OFF of the switch is not limited to the period of chaos generation, but may be set to an arbitrary period smaller than the period of pulse generation. It should be appreciated that the configuration is simplified by synchronizing the period of ON and OFF of the switch with the period of chaos generation. In this case, since the pulse is generated when the fluctuation superposed voltage is lower than the threshold, the probability of pulse generation is derived more easily, and exhibits a linear characteristic in the same manner.

The pulses can be counted without a need for the strict counter of this embodiment. Assuming that the pulses are charges stored in the capacitor, and potentials at both ends of the capacitor may be detected.

Instead of the vMOS-type structure, the mixer may have other similar structures provided that the mixer has a function of superposing an analog waveform.

Embodiment 2

A stochastic processor of the second embodiment of the present invention corresponds to the stochastic processor of the first embodiment, in which the pulse generation probability difference: η can be maximized.

From FIG. 13 and the first formula of the formulae (10) which have been studied in the first embodiment, η becomes maximum when $V=V_{min}$, and $T_R=\frac{2}{3}$, and $V=V_{max}$ and $T_R=0$.

From this, the following formula is established.

$$T=V_{max} \tag{14}$$

$$W_{max}=1.5(T-V_{min}) \tag{15}$$

From these two formulae, $$W_{max}=1.5(V_{max}-V_{min}) \tag{16}$$

η represented by the formula (11) is given by the following formula (17):

$$\eta=(W_{max}\cdot\tfrac{2}{3})/(2W_{max})=\tfrac{1}{3} \tag{17}$$

From the above, the following has been revealed.

In accordance with the present invention, it is possible to realize a stochastic processor in which the pulse generation probability has a minimum value when the input signal has a maximum value and has a maximum value when the input signal has a minimum value, and the generation probability varies linearly relative to the input signal. In addition, in the stochastic processor, the parameters by which the maximum pulse generation probability difference is obtained can be determined uniquely as described below.

Specifically, the threshold T is set to be equal to the maximum value $V_{max}$ of the input signal $V_{ana}$. The maximum amplitude $w_{max}$ of the fluctuation voltage $V_{cao}$ is set to 1.5 times as large as the amplitude of the input signal $V_{ana}$. In this case, η is equal to ⅓ corresponding to the maximum value.

As thus far described, in accordance with the stochastic processor of this embodiment, it is possible to determine a stochastic processor that obtains the largest pulse generation difference and hence has high detection sensitivity according to only the characteristic of the input signal, and it is therefore to provide a stochastic processor that has improved reliability as well as signal sensitivity.

Embodiment 3

A stochastic processor of the third embodiment of the present invention corresponds to the stochastic processor of the first embodiment processor, in which the pulse generation has a minimum value when the input signal has a minimum value and has a maximum value when the input signal has a maximum value.

In this case, since $V_{min}$ and $V_{max}$ replace each other in the formulae (9) and (10) of the first embodiment, the following formula is established.

$$\tfrac{2}{3} \leq T_R \leq 1 \tag{18}$$

$$P=1-T_R \tag{19}$$

Therefore, $0 \leq P \leq \tfrac{1}{3}$. The maximum value of the pulse generation probability P is equal to the maximum value of the second embodiment. And, the following formula is established.

$$\tfrac{2}{3} \leq (T-V_{max})/w_{max} \leq (T-V_{min})/w_{max} \leq 1 \tag{20}$$

From these formulae, $$(\tfrac{2}{3}\cdot w_{max}+V_{max}) \leq T \leq (w_{max}+V_{min}) \tag{21}$$

$w_{max}$ and T that satisfy the formula (21) are determined. For gaining the maximum efficiency, $$(\tfrac{2}{3}\cdot w_{max}+V_{max})=T=(w_{max}+V_{min}) \tag{22}$$

Therefore, $w_{max}$ and T are determined so as to satisfy the formulae (23) and (24):

$$w_{max}=3(V_{max}-V_{min}) \tag{23}$$

$$T=3V_{max}+4V_{min} \tag{24}$$

Thus, by determining the amplitude $w_{max}$ of the fluctuation voltage and the threshold T according to the formulae (23) and (24), the maximum pulse generation difference can be gained.

Embodiment 4

A stochastic processor according to a fourth embodiment of the present invention differs in a configuration of a thresholding unit from the stochastic processors of the first to third embodiments.

Figure 15:
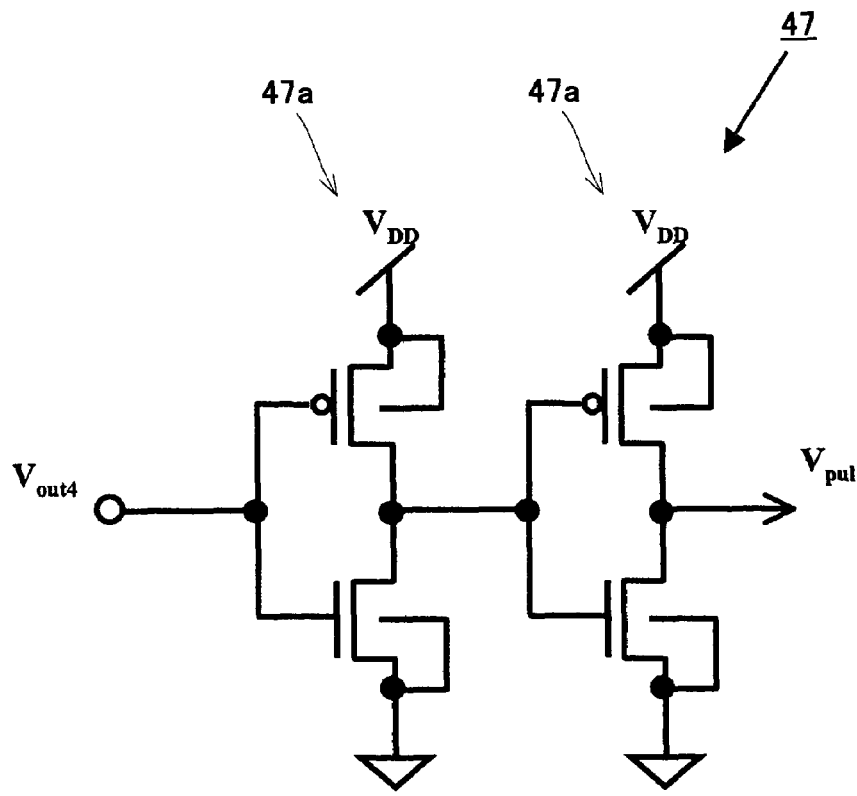
FIG. 15 is a circuit diagram showing a configuration of a thresholding unit 5 of a stochastic processor according to a fourth embodiment of the present invention.

FIG. 15 is a circuit diagram showing a configuration of a thresholding unit 47 of the stochastic processor of this embodiment.

As shown in FIG. 15, the thresholding unit 47 of this embodiment is substantially identical to that of the first embodiment except that inverters 47a are connected in two stages.

Figure 16:
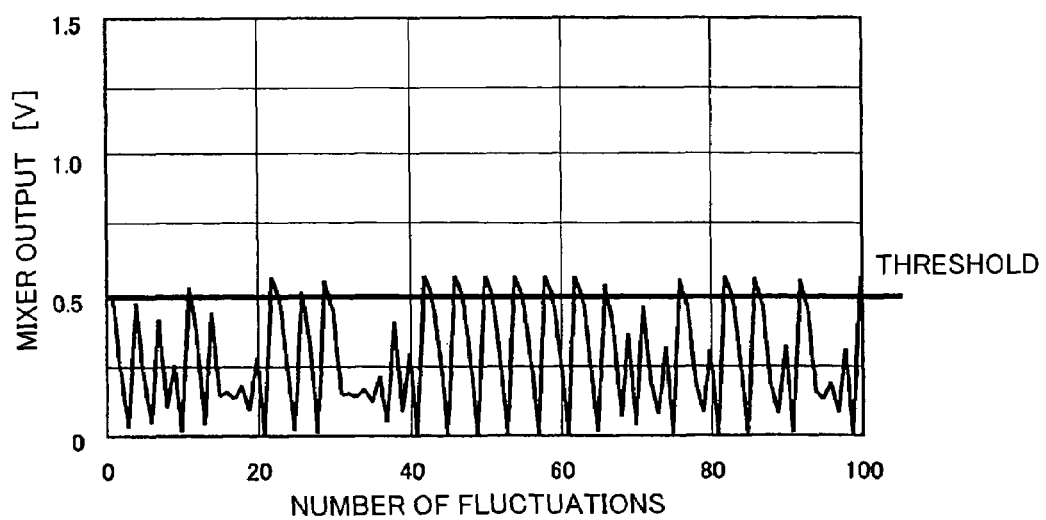
FIG. 16 is a graph showing a relationship between an output of a mixer and a threshold in the fourth embodiment of the present invention.
Figure 17:
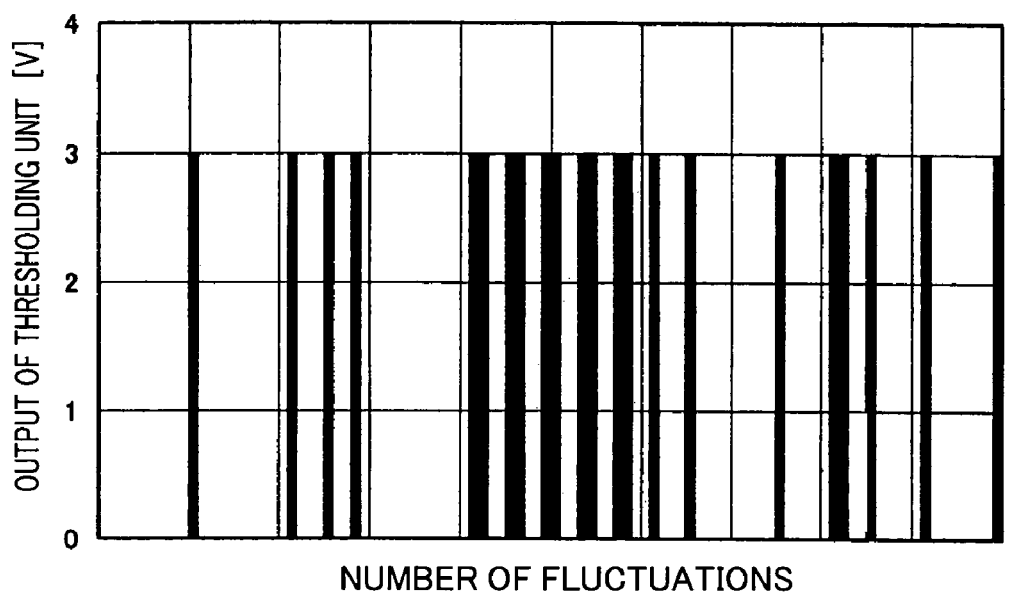
FIG. 17 is a graph showing an output of the thresholding unit in FIG. 15.

FIG. 16 is a graph showing an output of the mixer 45 of this embodiment. FIG. 17 is a graph showing an output of the thresholding unit 47 of this embodiment. In this embodiment, for example, a fluctuation superposed voltage is output from the mixer 47, and a threshold is set as shown in FIG. 16. In this case, pulses in FIG. 17 are output from the thresholding unit 47. The stochastic processor of this embodiment differs from the stochastic processors of the first to third embodiments in that rising of the pulse is generated when the fluctuation superposed voltage crosses the threshold from below to above in FIG. 16. This is because the thresholding unit 47 is comprised of the two-stage inverters 47a, and polarity of the output with respect to the input is inverted.

Figure 18A:
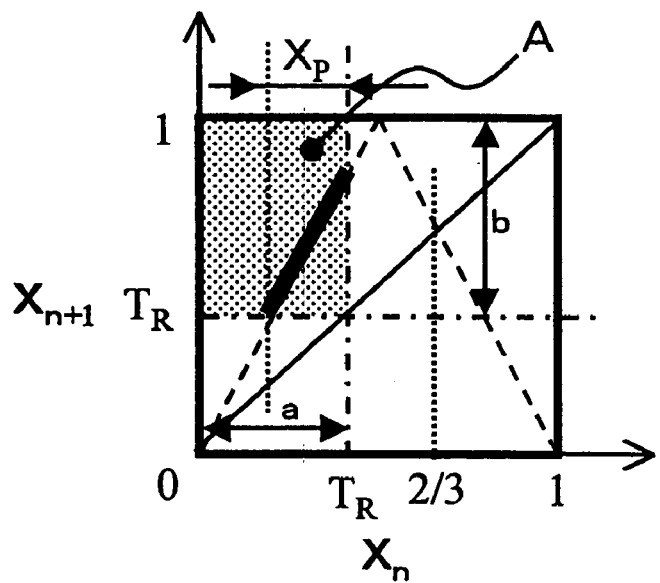
FIG. 18 is a view for explaining pulse generation probability of the stochastic processor of the fourth embodiment of the present invention.
Figure 18B:
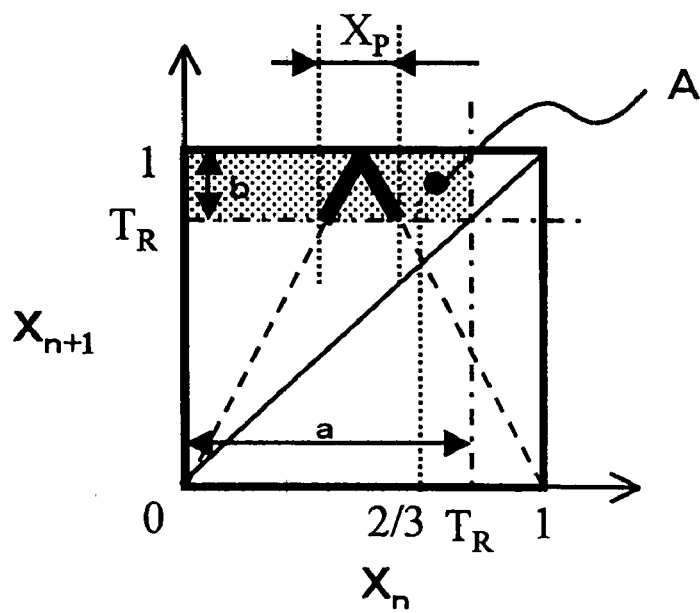

FIGS. 18A and 18B are views for explaining probability of pulse generation in this embodiment. In FIGS. 18A and 18B, the same reference numerals as those in FIGS. 12A and 12B denote the same or corresponding parts.

The difference between FIGS. 18A and 18B and FIGS. 12A and 12B is to calculate the probability at which the variation amount X transitions from a region in which $X_n$ is not more than $T_R$ to a region in which $X_n+1$ is not less than $T_R$, whereas the similarity between FIGS. 18A and 18B and FIGS. 12A and 12B is that the formula for obtaining the range of $X_P$ varies in the vicinity of a point where $T_R$ becomes $2/3$.

In the region of $T_R \leq 2/3$, $$P = X_P = T_R - T_R/2 = T_R/2 \quad (25)$$

In the region of $T_R \geq 2/3$, $$P = X_P = (2-T_R)/2 - T_R/2 = 1 - T_R \quad (26)$$

The inventors discovered that by comparing the formulae (25) and (26) to the formula (7) of the first embodiment, the formulae (25) and (26) are the same as the formula (7). In other words, study and optimization concept of the first to third embodiments are applicable to the stochastic processor of this embodiment.

This is reasonable, when carefully considering symmetry of an operation of the stochastic processor of the present invention. In the stochastic processor, the pulse is generated when the fluctuation (variation amount X) crosses the threshold. In other words, when fluctuation is continuously above or below the threshold, no pulse is generated, and therefore, an operation that crosses in a direction in which no pulse is generated is also necessary for the pulse to be generated. For this reason, the pulse generation probability is the same regardless of the direction in which the fluctuation crosses the threshold.

As described above, in the fourth embodiment, description has been given of the operation of the stochastic processor in which the polarity of the output of the thresholding unit with respect to the input is inverted with respect to those in the first to third embodiments, and the operation of the fourth embodiment can be handled in the same manner as in the operations of the first to fourth embodiments.

It would be obvious that in other possible configurations of the stochastic processor in this embodiment, optimal operation can be determined in the same manner. For example, the optimal operation can be determined in the same manner, as described in the third embodiment in which the value of the input signal is directly proportional to the number of pulses.

In accordance with the stochastic processor of the present invention, by applying the chaos of the tent mapping as the fluctuation, the pulse generation probability can be solved according to the formulae, the pulse generation probability can be made linear, and the amplitude of the fluctuation and the threshold that maximize its efficiency can be determined uniquely. The stochastic processor produced according to these aims has high operating efficiency and reliability.

Therefore, regarding non-essential matters in the present invention, for example, a circuit configuration in which the counter is configured to count falling of the pulse, may be altered in various ways.

Further, while in the first to fourth embodiments, the potential (voltage) is used as analog quantity (physical quantity) representing the signal, other analog quantities may be used. For example, when the analog quantity is a pulse width, pulse width fluctuation to be added to the pulse and the threshold are determined in the same manner. When the analog quantity is an electric charge amount, a charge corresponding to the fluctuation is added to the electronic charge, and is stored in a capacitor, thereby allowing the threshold to be detected as the potential. As a matter of course, these are only means that embodies the principle of the present invention.

Embodiment 5

Hereinafter, a stochastic computer according to a fifth embodiment of the present invention will be described with reference to the drawings. The stochastic computer of this embodiment comprises any of the stochastic processors of the first to fourth embodiments.

Figure 19:
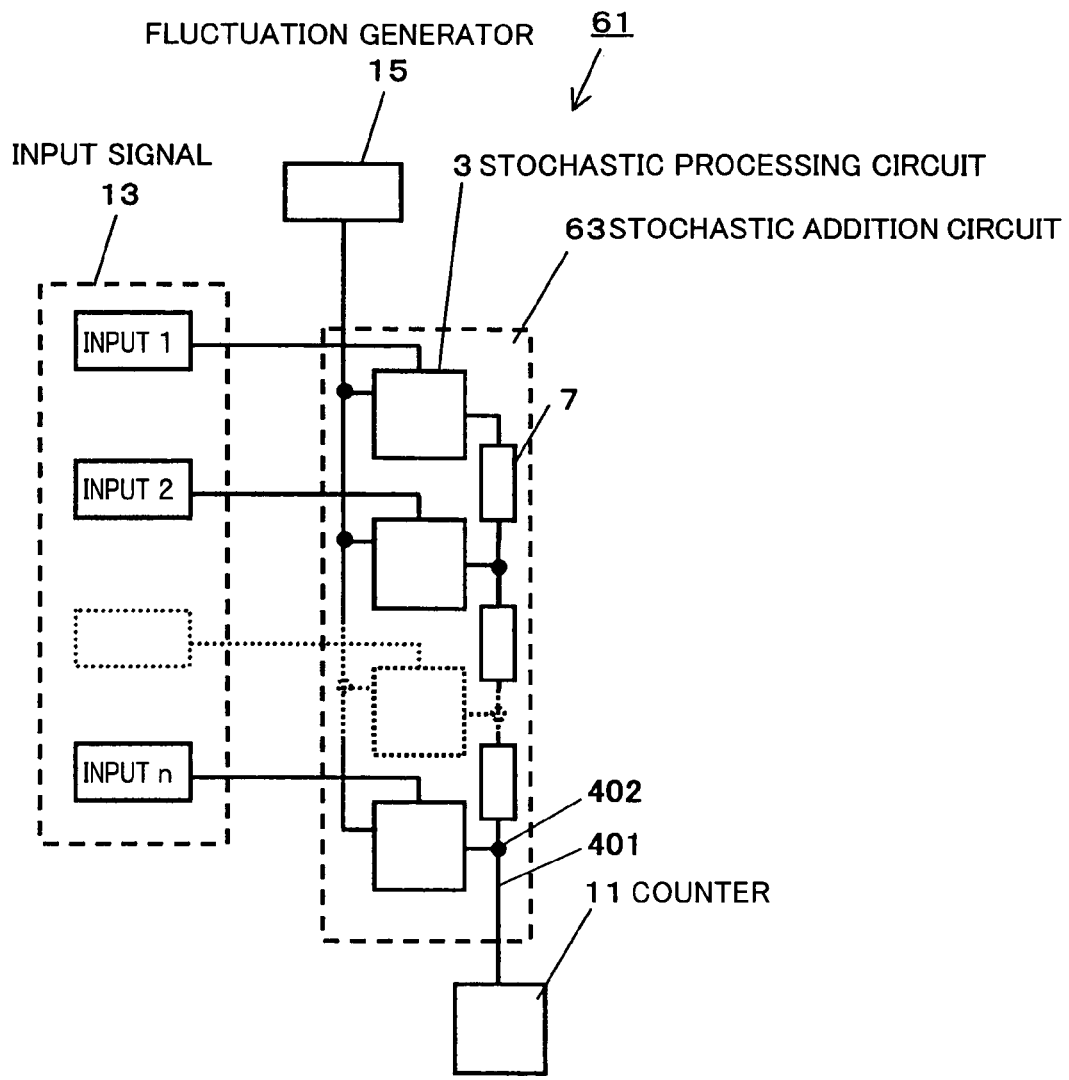
FIG. 19 is a block diagram showing a configuration of a stochastic computer according to a fifth embodiment of the present invention.

FIG. 19 is a block diagram showing a configuration of the stochastic computer of this embodiment. In FIG. 19, the same reference numerals as those in FIG. 2 denote the same or corresponding parts, which will not be further described. In FIG. 19, reference numeral 61 denotes a stochastic computer, and reference numeral 63 denotes a stochastic addition circuit. Reference numerals 7(1), 7(2) . . . 7(n) denote delay circuits. In this embodiment, the stochastic computer 61 is provided with n (a plurality of) stochastic processing circuits 3. In this embodiment, as the input signal 13, n signals are output and are respectively input to the corresponding stochastic processing circuits 3. Likewise, the output of the fluctuation generation circuit 15 is input to each of the stochastic processing circuits 3. Each of the stochastic processing circuits 3 has an internal circuit configuration similar to that shown in FIG. 2. The n stochastic processing circuits 3 are each connected to the output of its adjacent stochastic processing circuit 3 through the delay circuit 7 starting from the stochastic processing circuit 3 most distant from the counter 11 and the stochastic processing circuit 3 closest to the counter 11 is directly connected to the counter 11.

An operation of the stochastic computer configured as described above will be described below.

The input signal 13 is, for example, a vector composed of n elements, and predetermined analog voltages corresponding to the respective elements are output. The analog voltages are input to the corresponding stochastic processing circuits 3 as the input signals. When the fluctuation generator 15 generates a fluctuation voltage, each of the stochastic processing circuits 3 generates a pulse stochastically according to the principle described in the first to fourth embodiments. For example, in the stochastic processing circuits 3 having the configuration described in the second embodiment, the smaller the value of the input signal is, the more the generated pulses are. In this case, the pulses are output stochastically according to the values for the input signal 13 from the respective stochastic processing circuits 3 upon the fluctuation voltage being input to the stochastic processing circuits 3. The pulses are output substantially simultaneously according to the fluctuation signal. The delay circuits 7 delays the pulses to allow these pulses to reach the counter 11 at predetermined intervals. Accordingly, by giving fluctuation repeatedly, the stochastic processing circuits 3 generate pulses corresponding to the values for the input signal 13. As a result, the counter 11 gains a count corresponding to a total sum of analog voltage values corresponding to the elements of the input vector 13.

As described above, the stochastic computer of this embodiment is configured to stochastically obtain the total sum of the elements of the vector as the count by using any of the stochastic processors of the first to fourth embodiments.

Since operation of numerous minute analog values is difficult to operate in the existing semiconductor device, and, more often than not, current drive is performed, power consumption is increased. By using the stochastic computer of this embodiment, the pulses, i.e., the output of digital is easily obtained with low power consumption.

Embodiment 6

Hereinafter, a stochastic computer according to a sixth embodiment of the present invention will be described with reference to the drawings. The stochastic computer of this embodiment differs in pulse detecting method from the stochastic computer of the fifth embodiment.

Figure 20:
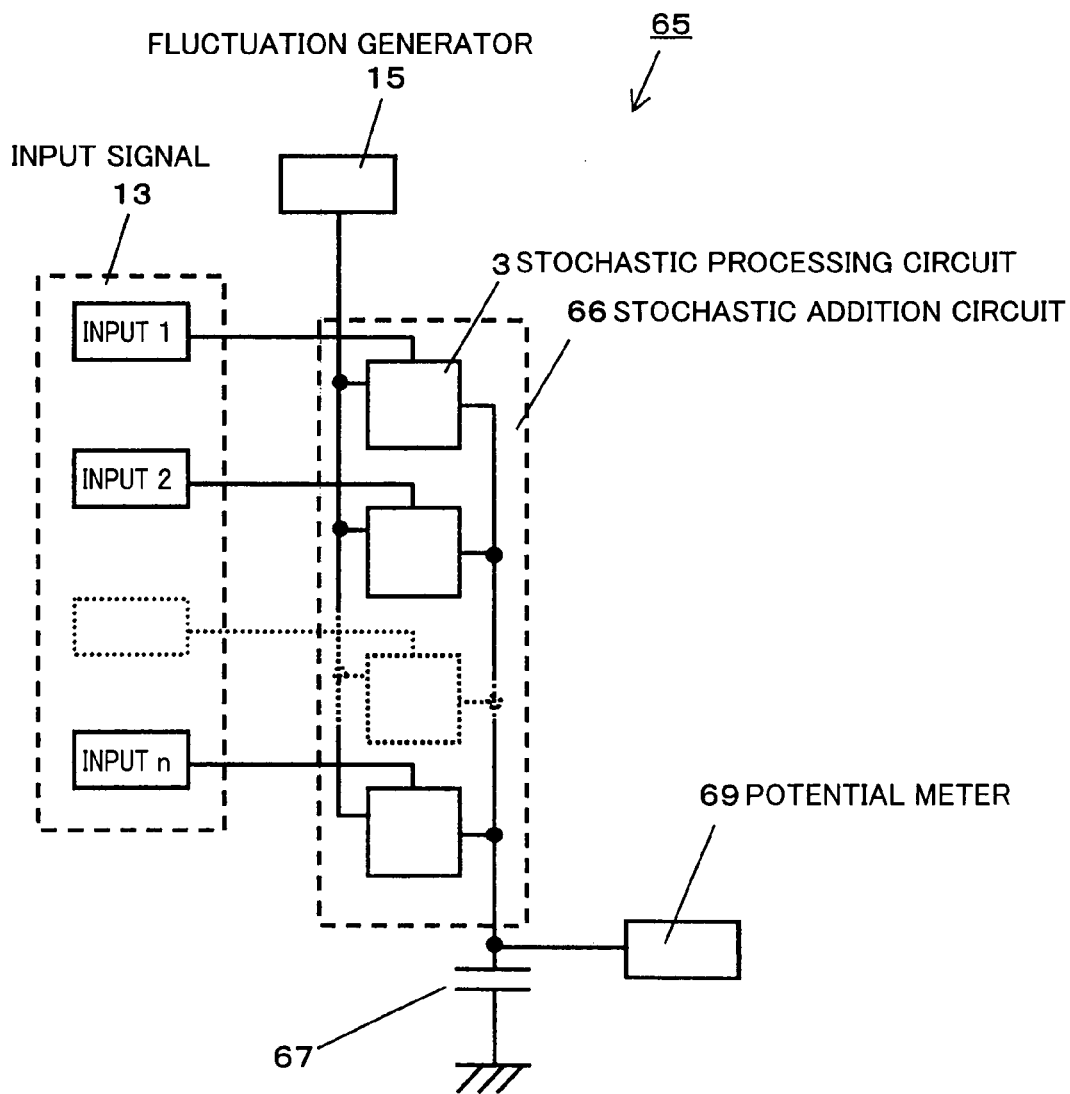
FIG. 20 is a block diagram showing a configuration of a stochastic computer according to a sixth embodiment of the present invention.

FIG. 20 is a block diagram showing a configuration of the stochastic computer according to this embodiment of the present invention. In FIG. 20, reference numerals as those in FIG. 19 denote the same or corresponding parts, which will not be described. In FIG. 20, reference numeral 65 denotes a stochastic computer, and reference numerals 66 denotes a stochastic addition circuit. And, reference numeral 67 denotes a capacitor as an integrator configured to integrate the pulse (to be precise, its current), and reference numeral 69 denotes a potential meter 69.

The stochastic computer of this embodiment is configured such that the charges due to the pulses output from the stochastic processing circuits 3 are stored in the capacitor 67, and the potential meter 69 measures potential variation at both ends of the charged capacitor, thereby detecting the total sum of the pulses. As in the stochastic computer of the fifth embodiment, the total sum of the elements of the input vector can be detected stochastically as the potential.

Embodiment 7

Hereinafter, a stochastic computer according to a seventh embodiment of the present invention will be described with reference to the drawings. The stochastic computer of this embodiment is configured to calculate a distance between two vectors.

Figure 21:
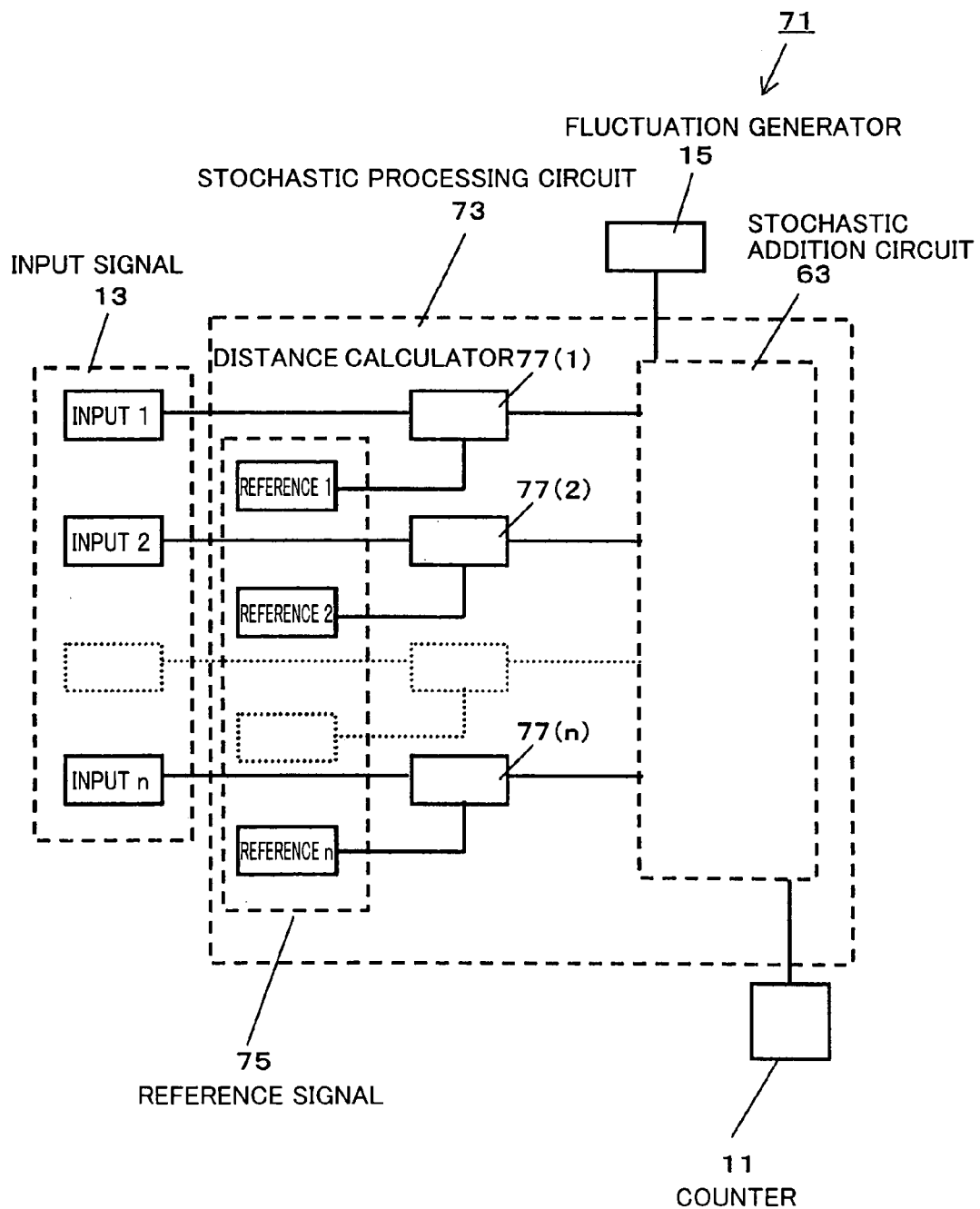
FIG. 21 is a block diagram showing a configuration of a stochastic computer according to a seventh embodiment of the present invention.

FIG. 21 is a block diagram showing a configuration of the stochastic computer according to this embodiment of the present invention. In FIG. 21, the same reference numerals as those in FIG. 19 denote the same or corresponding parts.

In FIG. 21, reference numeral 71 denotes a stochastic computer. Reference numeral 73 denotes a stochastic distance calculation circuit. Reference numeral 75 denotes a reference signal. The reference signal 75 represents a reference vector composed of n elements, and is composed of n analog voltage signals. Reference numerals 77(1), 77(2) . . . 77(n) denote distance calculators which are configured to output absolute values of analog voltage differences.

An operation of the stochastic computer configured as described above will be described below.

The stochastic computer of this embodiment is configured such that the distance calculators 77(1) to 77(n) calculate absolute values of differences between the n elements of the input signal 13 and the n elements of the reference signal 75, and input the absolute values to the stochastic addition circuit 63, thereby carrying out distance calculation between the input vector and the reference vector.

Data of the reference signal (data of the reference vector) 75 are written onto an analog memory (not shown), and thereafter, upon the input signal 13 being input to the distance calculators 77(1) to 77(n), these distance calculators 77(1) to 77(n) calculate the distances between elements of these vectors, and output the resulting distances as the voltage values, for example. Herein, the distance calculators 77(1) to 77(n) are each configured to output a lower voltage when the distance between the vectors is smaller. The voltage outputs representing these distances are input to the stochastic addition circuit 63, where the fluctuation voltage output from the fluctuation generator 15 is superposed on each of these voltage outputs, and the resulting voltage outputs are then subjected to thresholding process. As a result, the total sum of distances between the elements of the input vectors and the elements of the reference vectors is output as the number of pulses, which is counted by the counter 11.

By configuring the stochastic addition circuit 63 so that more pulses are generated when the input signal is smaller, the entire stochastic computer 71 operates such that the counter 11 counts more pulses when the distance of vectors between the input signal 13 and the reference signal 75 is smaller.

Thus, the stochastic computer of this embodiment makes the use of the characteristic in which the stochastic processor of the first to fourth embodiments can detect minute analog quantities easily, and the stochastic computer of the fifth and sixth embodiments can calculate the total sum of these minute quantities in parallel, thereby carrying out distance calculation between vectors as stochastic operation very efficiently.

It should be appreciated that, as a matter of course, the stochastic computer 71 operates in the same manner if the stochastic addition circuit 63 is replaced by the stochastic addition circuit 66 of the sixth embodiment.

Embodiment 8

Hereinafter, a stochastic computer according to an eighth embodiment of the present invention will be described with reference to the drawings. The stochastic computer of this embodiment is configured such that the stochastic computers of the seventh embodiment are arranged in parallel to allow vectors having a minimum distance to be detected by plural vector matching operations.

Figure 22:
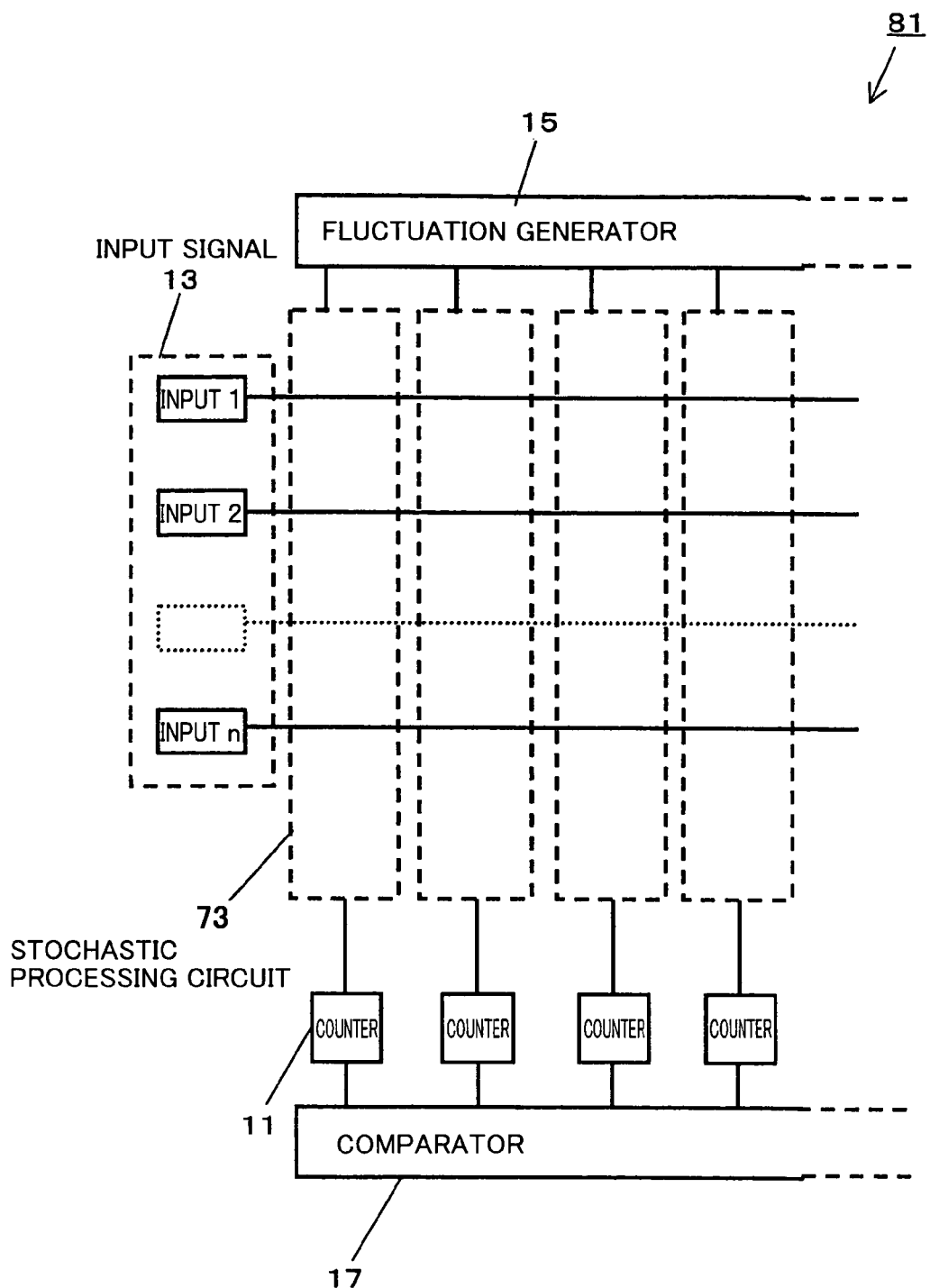
FIG. 22 is a block diagram showing a configuration of a stochastic computer according to an eighth embodiment of the present invention.
Figure 23:
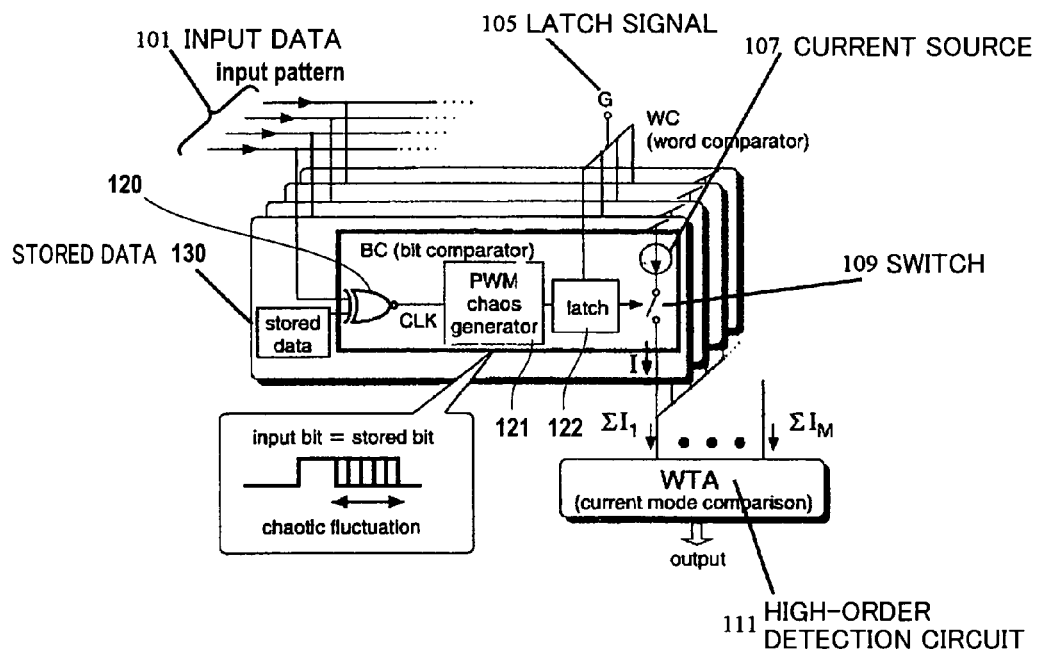
FIG. 23 is a circuit diagram showing a configuration of the conventional stochastic processor.
Figure 24:
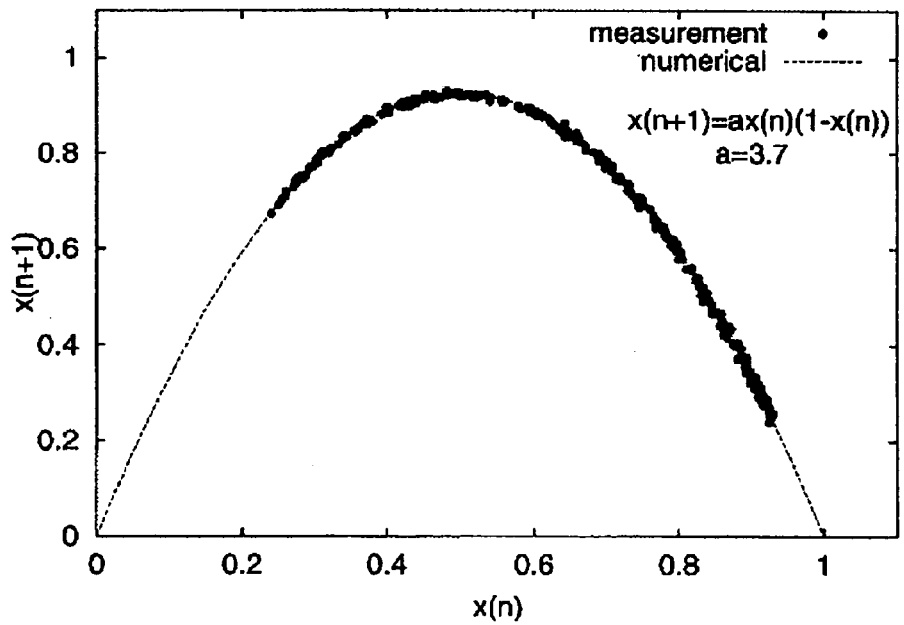
FIG. 24 is a view showing a mapping map of a logistic chaos for use in the conventional stochastic processor in FIG. 23.

FIG. 22 is a block diagram showing a configuration of the stochastic computer of this embodiment. In FIG. 22, the same reference numerals as those in FIG. 21 denote the same or corresponding parts, which will not be described.

In FIG. 22, reference numeral 81 denotes a stochastic computer and reference numeral 17 denotes a comparator. In this embodiment, the most significant bits of the counters 11 (e.g., $D_n$ in FIG. 4) are connected to the comparator 17.

The stochastic computer 81 of this embodiment is configured such that the stochastic distance calculation circuits 73 of the second embodiment are arranged in parallel with one another. The input signal 13 is input to each of the stochastic distance calculation circuits 73 and the fluctuation voltage from the fluctuation generator 15 is input to each of the stochastic distance calculation circuits 73. The counters 11 are provided so as to correspond to the stochastic distance calculation circuits 73, and the outputs of the respective counters 11 are input to the comparator 17.

Each of the stochastic distance calculation circuits 73 comprises n analog memories (not shown) corresponding to n elements of the reference vector, and data of the elements of the reference vector (reference signal 75) are written to the analog memories. And, when the vector of the input signal 13 is input as corresponding to plural reference vectors respectively written to the plural stochastic distance calculation circuits 73, it is detected that which of the reference vectors is closest to the vector of the input signal 13.

When the input signal 13 is input, and thereafter, the fluctuation voltage from the fluctuation generator 15 is input, more pulses are generated at the counters 11 when the distance between the vectors is smaller, as already described in the seventh embodiment. The counters 11 count these pulses. The fluctuation voltage continues to be input, and in time, the most significant bit of any of the counters 11 outputs a High signal. The comparator 17 detects the High signal, and outputs a signal indicating which of the counters 11 (i.e., stochastic distance calculation circuit 3) has generated High.

With the above described operation, it is possible to know the stochastic distance calculation circuit 73 to which the vector of the reference signal 75 which is closest to the vector of the input signal 3 has been written.

As described above, the stochastic computer 81 is configured to carry out the distance calculation in vector matching. In particular, the stochastic computer 81 provides the stochastic processor which is configured to compare analog data directly by stochastic operation, and make stochastic operation gradually closer to linear operation by increasing the number of times the stochastic operation is repeated, and which is produced and driven for the purpose of gaining the highest efficiency.

The stochastic computer of the present invention is especially effective in calculation of Manhattan distance between numerous vectors having numerous elements. The stochastic computer efficiently carries out operation of a number of variables which are difficult to handle in analog operation by making the best use of the parallel operation characteristic peculiar to analog operation and by introducing a concept of stochastic operation.

The stochastic computer of the present invention, uses the chaos signal introduced as fluctuation as chaos by tent mapping, and causes the stochastic processor to operate with the threshold and the chaos amplitude set to the values described in the first to fourth embodiments. Thereby, linearity is gained in distance calculation and the pulses are generated with high efficiency, so that reliability and high efficiency of processor operation are realized. As a result, it is possible to provide a processor configured to operate at high speeds and with low power consumption, based on a new concept different from that of the conventional computer. Such a stochastic computer greatly contributes to industry.

Numerous modifications and alternative embodiments of the invention will be apparent to those skilled in the art in the light of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A stochastic processor comprising:
   a fluctuation generator configured to generate and output analog quantity having fluctuation comprised of chaos of tent mapping;
   a mixer configured to output a fluctuation superposed signal with the analog quantity output from the fluctuation generator superposed on an input signal represented by analog quantity; and
   a thresholding unit configured to perform thresholding on the fluctuation superposed signal output from the mixer to generate and output a pulse.

2. The stochastic processor according to claim 1, wherein the thresholding unit is configured to perform the thresholding on the fluctuation superposed signal to generate a two-valued pulse.

3. The stochastic processor according to claim 2, further comprising a variation detector configured to generate and output a pulse in at least one of rising and falling of the two-valued pulse output from the thresholding unit.

4. The stochastic processor according to claim 3, further comprising a pulse detection means configured to detect the pulse output from the variation detector.

5. The stochastic processor according to claim 4, wherein the pulse detection means includes a counter configured to count the pulse.

6. The stochastic processor according to claim 4, wherein the pulse detection means includes an integrator configured to integrate a width of the pulse.

7. The stochastic processor according to claim 1, further comprising:
   a pulse detection means configured to detect the pulse output from the thresholding unit.

8. The stochastic processor according to claim 7, wherein the pulse detection means includes a counter configured to count the pulse.

9. The stochastic processor according to claim 7, wherein the pulse detection means includes an integrator configured to integrate a width of the pulse.

10. The stochastic processor according to claim 1, wherein when a maximum value of the analog quantity having the fluctuation is $w_{max}$, and a maximum value and a minimum value of the input signal are $V_{max}$ and $V_{min}$, respectively, a threshold T of the thresholding unit is not less than $V_{max}$, and $w_{max}$ is equal to 1.5 times as large as or larger than difference between T and $V_{min}$.

11. The stochastic processor according to claim 10, wherein T is equal to $V_{max}$, and $W_{max}$ is equal to 1.5 times as large as difference between $V_{max}$ and $V_{min}$.

12. The stochastic processor according to claim 1, wherein when a maximum value of the analog quantity having the fluctuation is $W_{max}$, and a maximum value and a minimum value of the input signal are $V_{max}$ and $V_{min}$, respectively, a threshold T of the thresholding unit is not less than $(2\ w_{max}/3 + V_{max})$ and not more than $(w_{max} + V_{min})$.

13. The stochastic processor according to claim 12, wherein

T is equal to $(3w_{max} + 4V_{min})$, and $w_{max}$ is equal to $3\ (V_{max} - V_{min})$.

14. A stochastic computer comprising:

a fluctuation generator configured to generate and output analog quantity having fluctuation comprised of chaos of tent mapping;

a plurality of stochastic processing circuits including mixers and thresholding units, each of the mixers being configured to output a fluctuation superposed signal with the analog quantity output from the fluctuation generator superposed on an input signal represented by analog quantity, and each of the thresholding units being configured to perform thresholding on the fluctuation superposed signal output from the mixer to generate and output a pulse; and a pulse detection means configured to detect pulses output from the thresholding units in the plurality of stochastic processing circuits.

15. The stochastic computer according to claim 14, wherein the pulse detection means includes a counter configured to count the pulse.

16. The stochastic computer according to claim 14, wherein the pulse detection means includes an integrator configured to integrate a width of the pulse.

17. The stochastic computer according to claim 14, wherein one output ends of the thresholding units in the plurality of stochastic processing circuits are connected in parallel to a common wire having an end connected to the pulse detection means, and delay circuits are each provided on a portion of the common wire between positions where the output ends of the thresholding units are connected to the common wire.

18. The stochastic computer according to claim 14, further comprising distance calculators in a predetermined number configured to calculate differences in elements in the predetermined number between the input vector and the reference vector, the stochastic processing circuits are provided in the predetermined number, and outputs of the distance calculators in the predetermined number are input to the mixers of the stochastic processing circuits in the predetermined number as the input signal, respectively.

19. The stochastic computer according to claim 18, further comprising a plurality of stochastic distance calculation circuits having the distance calculators in the predetermined number and the stochastic processing circuits in the predetermined number, the pulse detection means are provided so as to correspond to the plurality of stochastic distance calculation circuits, and the plurality of reference vectors are input to the plurality of stochastic distance calculation circuits, respectively.

\* \* \* \* \*